(12) United States Patent
Li

(10) Patent No.: US 11,022,455 B2
(45) Date of Patent: Jun. 1, 2021

(54) SYSTEMS AND METHODS FOR PROVIDING A RELIABILITY OF PASSING TIME FOR A PATH IN ROUTE PLANNING

(71) Applicant: BEIJING DIDI INFINITY TECHNOLOGY AND DEVELOPMENT CO., LTD., Beijing (CN)

(72) Inventor: Haibo Li, Beijing (CN)

(73) Assignee: BEIJING DIDI INFINITY TECHNOLOGY AND DEVELOPMENT CO., LTD., Beijing (CN)

(*) Notice: Subject to any disclaimer, the term of this patent is extended or adjusted under 35 U.S.C. 154(b) by 0 days.

(21) Appl. No.: 17/093,589

(22) Filed: Nov. 9, 2020

(65) Prior Publication Data
US 2021/0088349 A1 Mar. 25, 2021

Related U.S. Application Data

(63) Continuation of application No. PCT/CN2019/090631, filed on Jun. 11, 2019.

(30) Foreign Application Priority Data

Jun. 6, 2019 (CN) .......................... 201910492616.8

(51) Int. Cl.
*G01C 21/34* (2006.01)
(52) U.S. Cl.
CPC ..... *G01C 21/3492* (2013.01); *G01C 21/3461* (2013.01); *G01C 21/3484* (2013.01)
(58) Field of Classification Search
CPC ............ G01C 21/3492; G01C 21/3461; G01C 21/3484
See application file for complete search history.

(56) References Cited

U.S. PATENT DOCUMENTS 5,638,280 A * 6/1997 Nishimura ......... G01C 21/3446
340/990
6,298,303 B1 * 10/2001 Khavakh ................ G01C 21/34
701/533
(Continued)

FOREIGN PATENT DOCUMENTS

CN 101436347 A 5/2009
CN 102238193 A 12/2011
(Continued)

OTHER PUBLICATIONS

International Search Report in PCT/CN2019/090631 dated Mar. 9, 2020, 5 pages.
(Continued)

*Primary Examiner* — Behrang Badii
(74) *Attorney, Agent, or Firm* — Metis IP LLC

(57) ABSTRACT

The present disclosure relates to systems and methods for providing a reliability of passing time for a path in route planning. The methods may include obtaining a route planning request from a user terminal; determining a plurality of candidate paths; determining a first estimated travel time cost and a first variance for each link of a target candidate path; determining a second estimated travel time cost for the target candidate path based on the first estimated travel time cost of each link; determining a second variance for the target candidate path based on the first variance associated with each link of the target candidate path; determining a reliability of passing time for the target candidate path based on the second estimated travel time cost and the second variance; and directing the user terminal to display the target candidate path with the reliability of passing time.

20 Claims, 11 Drawing Sheets

(56) References Cited

U.S. PATENT DOCUMENTS

| | | | |
|---|---|---|---|
| 8,160,810 B2* | 4/2012 | Morikawa | G01C 21/3469 |
| | | | 701/423 |
| 10,157,422 B2* | 12/2018 | Jordan Peters | G06Q 10/04 |
| 2008/0004794 A1 | 1/2008 | Horvitz | |
| 2013/0046456 A1* | 2/2013 | Scofield | G01C 21/3453 |
| | | | 701/117 |
| 2014/0278103 A1* | 9/2014 | Daikoku | G01C 21/3469 |
| | | | 701/533 |
| 2015/0279122 A1* | 10/2015 | Lorenzen | H04L 67/12 |
| | | | 705/13 |
| 2017/0219368 A1 | 8/2017 | Meredith et al. | |
| 2020/0370902 A1* | 11/2020 | Rolf | G01C 21/3446 |
| 2020/0370907 A1* | 11/2020 | Cajias | G01C 21/3446 |

FOREIGN PATENT DOCUMENTS

| | | |
|---|---|---|
| CN | 102956105 B | 12/2014 |
| CN | 106197449 A | 12/2016 |
| CN | 107145991 A | 9/2017 |
| CN | 105551244 B | 12/2017 |
| CN | 108305489 A | 7/2018 |

OTHER PUBLICATIONS

Written Opinion in PCT/CN2019/090631 dated Mar. 9, 2020, 5 pages.
Ioannis Kaparias et al., A New Measure of Travel Time Reliability for In-vehicle Navigation Systems, Journal of Intelligent Transportation Systems, 12(4), 2008, 20 pages.

* cited by examiner

800

- 810 Obtaining a historical average travel time cost of the link at a historical target time corresponding to the target time

- 820 Obtaining a historical travel time cost of the link at the historical target time on each historical day

- 830 Determining the third variance based on the historical average travel time cost and the historical travel time cost of the link at the historical target time on each historical day

```
┌─────────────────────────────────────────────────┐
│ Constructing a normal distribution based on the second │
│ estimated travel time cost and the second variance,    │ ∿ 1010
│ wherein the second estimated travel time cost is a     │
│ mean of the normal distribution and the second         │
│ variance is a variance of the normal distribution      │
└─────────────────────────────────────────────────┘
                        ↓
┌─────────────────────────────────────────────────┐
│ Determining the reliability of passing time for the target │ ∿ 1020
│ candidate path based on the constructed normal             │
│ distribution                                               │
└─────────────────────────────────────────────────┘
```

FIG. 10

SYSTEMS AND METHODS FOR PROVIDING A RELIABILITY OF PASSING TIME FOR A PATH IN ROUTE PLANNING

CROSS-REFERENCE TO RELATED APPLICATIONS

This application is a continuation of International Application No. PCT/CN2019/090631, filed on Jun. 11, 2019, which claims priority of Chinese Application No. 201910492616.8, filed on Jun. 6, 2019, the contents of which are incorporated herein in its entirety by reference.

TECHNICAL FIELD

The present disclosure generally relates to systems and methods for route planning, and more particularly, to systems and methods for providing a reliability of passing time for a path in route planning.

BACKGROUND

With the popularity of location-based services (LBS), people's travel habits are increasingly affected by mobile maps, particularly in their most important and frequently used function of providing route planning and recommendation services. Traditional internet maps usually provide passing time (or an estimated arrival time) for a path in route planning, but do not provide a reliability of the passing time, which refers to a probability of likelihood of traveling through the path within a particular passing time. People tend to have different priorities, depending on the occasions, when deciding which path to take. Sometimes a shortest time is favored more, but sometimes the reliability to get to the destination on time is more important. Thus, it is desirable to provide systems and methods for providing a reliability of passing time for a path in route planning to help the user to select a path more efficiently and improve user experience.

SUMMARY

An aspect of the present disclosure introduces a system for providing a reliability of passing time for a path in route planning. The system may include at least one storage medium including a set of instructions for providing a reliability for a path in route planning, and at least one processor in communication with the storage medium. When executing the set of instructions, the at least one processor may perform the following operations. The at least one processor may obtain a route planning request including a start time from a user terminal. The at least one processor may also determine a plurality of candidate paths for the route planning request. Each candidate path may include a plurality of links. The at least one processor may also, for each link of the plurality of links of a target candidate path, determine a first estimated travel time cost of the link at a target time associated with the start time and a first variance associated with the link. The at least one processor may also determine a second estimated travel time cost of the target candidate path at the start time based on the first estimated travel time cost of each link of the target candidate path and a second variance associated with the target candidate path based on the first variance. The at least one processor may also determine a reliability of passing time for the target candidate path based on the second estimated travel time cost and the second variance. The reliability of passing time may reflect a probability that a vehicle associated with the user terminal passes through the target candidate path within a particular travel time cost. The at least one processor may also send signals to the user terminal to direct the user terminal to display the target candidate path together with the corresponding particular travel time cost and the corresponding reliability on a user interface of the user terminal.

In some embodiments, to determine the first estimated travel time cost, the at least one processor may further obtain a historical travel time cost of the link at a historical target time corresponding to the target time. The at least one processor may further obtain a current travel time cost of the link at a current time. The at least one processor may further determine a time interval between the target time and the current time. The at least one processor may further determine the first estimated travel time cost based on the historical travel time cost, the current travel time cost, and the time interval.

In some embodiments, to determine the first variance associated with the link, the at least one processor may further determine a third variance associated with a historical average travel time cost. The at least one processor may further determine a time interval between the target time and the current time. The at least one processor may further determine the first variance associated with the link based on the third variance and the time interval.

In some embodiments, to determine the third variance, the at least one processor may further obtain a historical average travel time cost of the link at a historical target time corresponding to the target time. The at least one processor may further obtain a historical travel time cost of the link at the historical target time on each historical day. The at least one processor may further determine the third variance based on the historical average travel time cost and the historical travel time cost of the link at the historical target time on each historical day.

In some embodiments, to obtain the historical travel time cost, the at least one processor may further determine the start time is on a weekday or a weekend. In response to a determination that the start time is on a weekday, the at least one processor may further determine an average historical travel time cost of the link at the historical target time corresponding to the target time of a first predetermined number of historical weekdays as the historical travel time cost.

In some embodiments, to obtain the historical travel time cost, the at least one processor may further determine the start time is on a weekday or a weekend. In response to a determination that the start time is on a weekend, the at least one processor may further determine an average historical travel time cost of the link at the historical target time corresponding to the target time of a second predetermined number of historical weekends as the historical travel time cost.

In some embodiments, to determine the second estimated travel time cost, the at least one processor may further determine a sum of the first estimated travel time cost of each of the plurality of links of the target candidate path as the second estimated travel time cost.

In some embodiments, to determine the second variance, the at least one processor may further determine a sum of the first variance of each of the plurality of links of the target candidate path as the second variance.

In some embodiments, the estimated travel time cost on each link may be a normal distribution.

In some embodiments, to determine the reliability of passing time for the target candidate path, the at least one processor may further construct a normal distribution based on the second estimated travel time cost and the second variance. The second estimated travel time cost may be a mean of the normal distribution and the second variance may be a variance of the normal distribution. The at least one processor may further determine the reliability of passing time for the target candidate path based on the constructed normal distribution.

According to another aspect of the present disclosure, a method for providing a reliability of passing time for a path in route planning is provided. The method may include obtaining a route planning request including a start time from a user terminal. The method may also include determining a plurality of candidate paths for the route planning request. Each candidate path may include a plurality of links. For each link of the plurality of links of a target candidate path, the method may also include determining a first estimated travel time cost of the link at a target time associated with the start time, and a first variance associated with the link. The method may also include determining a second estimated travel time cost of the target candidate path at the start time based on the first estimated travel time cost of each link of the target candidate path, and a second variance associated with the target candidate path based on the first variance. The method may also include determining a reliability of passing time for the target candidate path based on the second estimated travel time cost and the second variance. The reliability of passing time may reflect a probability that a vehicle associated with the user terminal passes through the target candidate path within a particular travel time cost. The method may also include sending signals to the user terminal to direct the user terminal to display the target candidate path together with the corresponding particular travel time cost and the corresponding reliability on a user interface of the user terminal.

According to still another aspect of the present disclosure, a non-transitory computer-readable medium, comprising at least one set of instructions compatible for providing a reliability of passing time for a path in route planning, is provided. When executed by at least one processor of an electrical device, the at least one set of instructions may direct the at least one processor to perform the following operations. The at least one processor may obtain a route planning request including a start time from a user terminal. The at least one processor may also determine a plurality of candidate paths for the route planning request. Each candidate path may include a plurality of links. The at least one processor may also, for each link of the plurality of links of a target candidate path, determine a first estimated travel time cost of the link at a target time associated with the start time and a first variance associated with the link. The at least one processor may also determine a second estimated travel time cost of the target candidate path at the start time based on the first estimated travel time cost of each link of the target candidate path and a second variance associated with the target candidate path based on the first variance. The at least one processor may also determine a reliability of passing time for the target candidate path based on the second estimated travel time cost and the second variance. The reliability of passing time may reflect a probability that a vehicle associated with the user terminal passes through the target candidate path within a particular travel time cost. The at least one processor may also send signals to the user terminal to direct the user terminal to display the target candidate path together with the corresponding particular travel time cost and the corresponding reliability on a user interface of the user terminal.

According to still another aspect of the present disclosure, a system for providing a reliability of passing time for a path in route planning is provided. The system may include a request obtaining module, a candidate path determining module, a time cost determining module, a variance determining module, and a displaying module. The request obtaining module may be configured to obtain a route planning request including a start time from a user terminal. The candidate path determining module may be configured to determine a plurality of candidate paths for the route planning request. Each candidate path may include a plurality of links. For each link of the plurality of links of a target candidate path, the time cost determining module may be configured to determine a first estimated travel time cost of the link at a target time associated with the start time. The time cost determining module may also be configured to determine a second estimated travel time cost of the target candidate path at the start time based on the first estimated travel time cost of each link of the target candidate path. For each link of the plurality of links of a target candidate path, the variance determining module may be configured to determine a first variance associated with the link. The variance determining module may also be configured to determine a second variance associated with the target candidate path based on the first variance. The reliability determining module may be configured to determine a reliability of passing time for the target candidate path based on the second estimated travel time cost and the second variance. The reliability of passing time may reflect a probability that a vehicle associated with the user terminal passes through the target candidate path within a particular travel time cost. The displaying module may be configured to send signals to the user terminal to direct the user terminal to display the target candidate path together with the corresponding particular travel time cost and the corresponding reliability on a user interface of the user terminal.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 8 is a flowchart illustrating an exemplary process for determining a third variance associated with a historical average travel time cost according to some embodiments of the present disclosure;

FIG. 10 is a flowchart illustrating an exemplary process for determining a reliability of passing time for a target candidate path according to some embodiments of the present disclosure.

DETAILED DESCRIPTION

Figure 1:
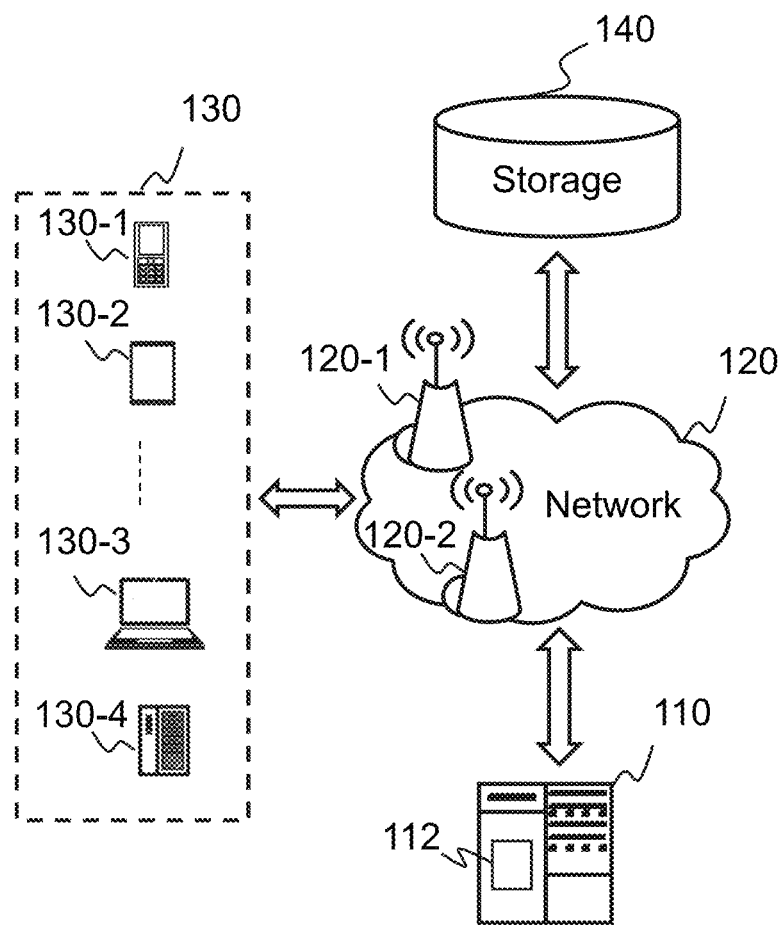
FIG. 1 is a schematic diagram illustrating an exemplary system according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprises," "comprising," "includes," and/or "including" when used in this disclosure, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operations and functions of the related elements of structure and the combination of parts and economies of manufacture, may become more apparent upon consideration of the following description with reference to the accompanying drawing(s), all of which form part of this specification. It is to be expressly understood, however, that the drawing(s) is for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

An aspect of the present disclosure relates to systems and methods for providing a reliability of passing time for a path in route planning. To this end, the systems and methods may determine an estimated travel time cost and a variance that indicates a fluctuation around the estimated travel time cost or a stability of the estimated travel time cost for each possible link. The systems and methods may determine an estimated travel time cost and a variance for a possible path based on the estimated travel time costs and the variances of a plurality of possible links that are included in the possible path. The systems and methods may also construct a normal distribution based on the estimated travel time cost and the variance of the possible path and determine a reliability of a passing time of the possible path based on the normal distribution. The systems and methods may further send the reliability of passing time and the corresponding passing time together with the possible path to a user terminal for display. In this way, the systems and methods of the present disclosure may help a user to select a path more efficiently and improve user experience.

FIG. 1 is a schematic diagram of an exemplary artificial intelligence (AI) system 100 according to some embodiments of the present disclosure. For example, the system 100 may be an online to offline service platform for providing services such as taxi hailing, chauffeur services, delivery vehicles, carpool, bus service, driver hiring, shuttle services, online navigation services, good delivery services, etc. The system 100 may include a server 110, a network 120, a user terminal 130, and a storage 140. The server 110 may include a processing engine 112.

The server 110 may be configured to process information and/or data relating to route planning. For example, the server 110 may determine a plurality of candidate paths in response to a route planning request. As another example, the server 110 may determine a reliability of passing time for each target candidate path of at least one target candidate path among the plurality of candidate paths. In some embodiments, the server 110 may be a single server, or a server group. The server group may be centralized, or distributed (e.g., server 110 may be a distributed system). In some embodiments, the server 110 may be local or remote. For example, the server 110 may access information and/or data stored in the user terminal 130, and/or the storage 140 via the network 120. As another example, the server 110 may connect the user terminal 130, and/or the storage 140 to access stored information and/or data. In some embodiments, the server 110 may be implemented on a cloud platform. Merely by way of example, the cloud platform may be a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure.

In some embodiments, the server 110 may include a processing engine 112. The processing engine 112 may process information and/or data relating to relating to route planning to perform one or more functions described in the present disclosure. For example, for each link of the plurality of links of a target candidate path, the processing engine 112 may determine a first estimated travel time cost of the link and a first variance associated with the link. The processing engine 112 may further determine a second estimated time cost of the target candidate path and a second variance associated with the target candidate path based on the first estimated travel time costs and the first variances of the plurality of links. As another example, the processing engine 112 may determine a reliability of passing time for the target candidate path based on the second estimated time cost and the second variance. In some embodiments, the processing engine 112 may include one or more processing engines (e.g., single-core processing engine(s) or multi-core processor(s)). Merely by way of example, the processing engine 112 may be one or more hardware processors, such as a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

The network 120 may facilitate exchange of information and/or data. In some embodiments, one or more components of the system 100 (e.g., the server 110, the user terminal 130, and the storage 140) may transmit information and/or data to other component(s) in the system 100 via the network 120. For example, the server 110 may obtain a route planning request including a start time from a user terminal via the network 120. As another example, the server 110 may direct the user terminal to display at least one target candidate path together with passing time and corresponding reliability of passing time via the network 120. In some embodiments, the network 120 may be any type of wired or wireless network, or combination thereof. Merely by way of example, the network 120 may be a cable network, a wireline network, an optical fiber network, a telecommunications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the system 100 may be connected to the network 120 to exchange data and/or information between them.

The user terminal 130 may be any electronic device used by a service requester of a route planning service. In some embodiments, the user terminal 130 may be a mobile device 130-1, a tablet computer 130-2, a laptop computer 130-3, a desktop computer 130-4, or the like, or any combination thereof. In some embodiments, the mobile device 130-1 may be a wearable device, a smart mobile device, a virtual reality device, an augmented reality device, or the like, or any combination thereof. In some embodiments, the wearable device may be a smart bracelet, a smart footgear, a smart glass, a smart helmet, a smart watch, a smart clothing, a smart backpack, a smart accessory, or the like, or any combination thereof. In some embodiments, the smart mobile device may be a smartphone, a personal digital assistance (PDA), a gaming device, a navigation device, a point of sale (POS) device, or the like, or any combination thereof. In some embodiments, the virtual reality device and/or the augmented reality device may be a virtual reality helmet, a virtual reality glass, a virtual reality patch, an augmented reality helmet, an augmented reality glass, an augmented reality patch, or the like, or any combination thereof. For example, the virtual reality device and/or the augmented reality device may be a Google Glass™, a RiftCon™, a Fragments™, a Gear VR™, etc. In some embodiments, the desktop computer 130-4 may be an onboard computer, an onboard television, etc.

In some embodiments, the user terminal 130 may be a device with positioning technology for locating the position of the passenger and/or the user terminal 130. The positioning technology used in the present disclosure may be a global positioning system (GPS), a global navigation satellite system (GLONASS), a compass navigation system (COMPASS), a Galileo positioning system, a quasi-zenith satellite system (QZSS), a wireless fidelity (WiFi) positioning technology, or the like, or any combination thereof. One or more of the above positioning technologies may be used interchangeably in the present disclosure.

In some embodiments, the user terminal 130 may further include at least one network port. The at least one network port may be configured to send information to and/or receive information from one or more components in the system 100 (e.g., the server 110, the storage 140) via the network 120. In some embodiments, the user terminal 130 may be implemented on a computing device 200 having one or more components illustrated in FIG. 2, or a mobile device 300 having one or more components illustrated in FIG. 3 in the present disclosure.

The storage 140 may store data and/or instructions. For example, the storage 140 may store data obtained from the user terminal 130 (e.g., a route planning request). As another example, the storage 140 may store historical data of a link (e.g., a historical travel time cost of the link at a particular time). As still another example, the storage 140 may store data and/or instructions that the server 110 may execute or use to perform exemplary methods described in the present disclosure. In some embodiments, the storage 140 may be a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random-access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 140 may be implemented on a cloud platform. Merely by way of example, the cloud platform may be a private cloud, a public cloud, a hybrid cloud, a community cloud, a distributed cloud, an inter-cloud, a multi-cloud, or the like, or any combination thereof.

In some embodiments, the storage 140 may include at least one network port to communicate with other devices in the system 100. For example, the storage 140 may be connected to the network 120 to communicate with one or more components of the system 100 (e.g., the server 110, the user terminal 130) via the at least one network port. One or more components in the system 100 may access the data or instructions stored in the storage 140 via the network 120. In some embodiments, the storage 140 may be directly connected to or communicate with one or more components in the system 100 (e.g., the server 110, the user terminal 130). In some embodiments, the storage 140 may be part of the server 110.

In some embodiments, one or more components of the system 100 (e.g., the server 110, the user terminal 130, and the storage 140) may communicate with each other in form of electronic and/or electromagnetic signals, through wired and/or wireless communication. In some embodiments, the system 100 may further include at least one data exchange port. The at least one exchange port may be configured to receive information and/or send information relating to the route planning service (e.g., in form of electronic signals and/or electromagnetic signals) between any electronic devices in the system 100. In some embodiments, the at least one data exchange port may be one or more of an antenna, a network interface, a network port, or the like, or any combination thereof. For example, the at least one data exchange port may be a network port connected to the server 110 to send information thereto and/or receive information transmitted therefrom.

Figure 2:
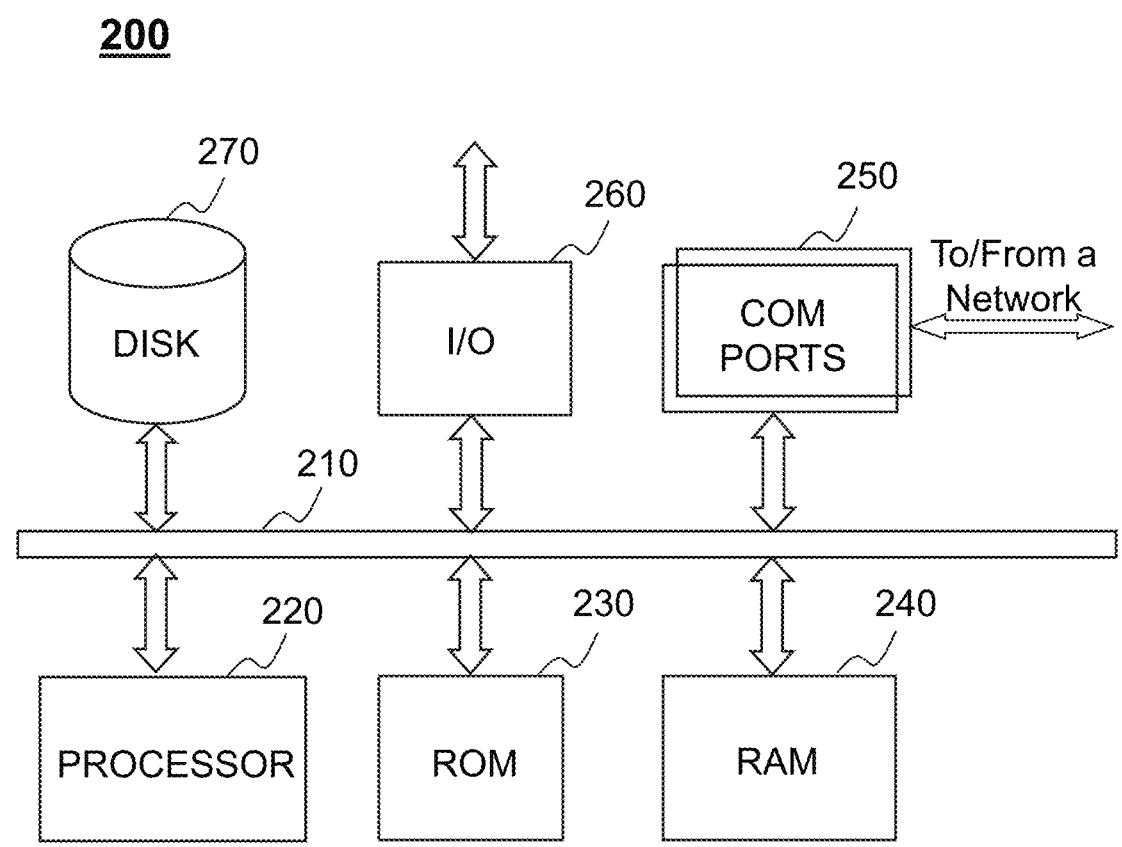
FIG. 2 is a schematic diagram illustrating exemplary hardware and/or software components of a computing device according to some embodiments of the present disclosure.

FIG. 2 is a schematic diagram illustrating exemplary hardware and software components of a computing device 200 on which the server 110, and/or the user terminal 130 may be implemented according to some embodiments of the present disclosure. For example, the processing engine 112 may be implemented on the computing device 200 and configured to perform functions of the processing engine 112 disclosed in this disclosure.

The computing device 200 may be used to implement a system 100 for the present disclosure. The computing device 200 may be used to implement any component of system 100 that perform one or more functions disclosed in the present disclosure. For example, the processing engine 112 may be implemented on the computing device 200, via its hardware, software program, firmware, or a combination thereof. Although only one such computer is shown, for convenience, the computer functions relating to the online to offline service as described herein may be implemented in a distributed fashion on a number of similar platforms, to distribute the processing load.

The computing device 200, for example, may include COM ports 250 connected to and from a network connected thereto to facilitate data communications. The COM port 250 may be any network port or data exchange port to facilitate data communications. The computing device 200 may also include a processor (e.g., the processor 220), in the form of one or more processors (e.g., logic circuits), for executing program instructions. For example, the processor may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. The processing circuits may also generate electronic signals including the conclusion or the result and a triggering code. In some embodiments, the trigger code may be in a format recognizable by an operation system (or an application installed therein) of an electronic device (e.g., the user terminal 130) in the system 100. For example, the trigger code may be an instruction, a code, a mark, a symbol, or the like, or any combination thereof, that can activate certain functions and/or operations of a mobile phone or let the mobile phone execute a predetermined program(s). In some embodiments, the trigger code may be configured to rend the operation system (or the application) of the electronic device to generate a presentation of the conclusion or the result (e.g., a prediction result) on an interface of the electronic device. Then the interface circuits may send out the electronic signals from the processing circuits via the bus 210.

The exemplary computing device may include the internal communication bus 210, program storage and data storage of different forms including, for example, a disk 270, and a read-only memory (ROM) 230, or a random access memory (RAM) 240, for various data files to be processed and/or transmitted by the computing device. The exemplary computing device may also include program instructions stored in the ROM 230, RAM 240, and/or other type of non-transitory storage medium to be executed by the processor 220. The methods and/or processes of the present disclosure may be implemented as the program instructions. The exemplary computing device may also include operation systems stored in the ROM 230, RAM 240, and/or other type of non-transitory storage medium to be executed by the processor 220. The program instructions may be compatible with the operation systems for providing the online to offline service. The computing device 200 also includes an I/O component 260, supporting input/output between the computer and other components. The computing device 200 may also receive programming and data via network communications.

Merely for illustration, only one processor is illustrated in FIG. 2. Multiple processors are also contemplated; thus, operations and/or method steps performed by one processor as described in the present disclosure may also be jointly or separately performed by the multiple processors. For example, if in the present disclosure the processor of the computing device 200 executes both step A and step B, it should be understood that step A and step B may also be performed by two different processors jointly or separately in the computing device 200 (e.g., the first processor executes step A and the second processor executes step B, or the first and second processors jointly execute steps A and B).

Figure 3:
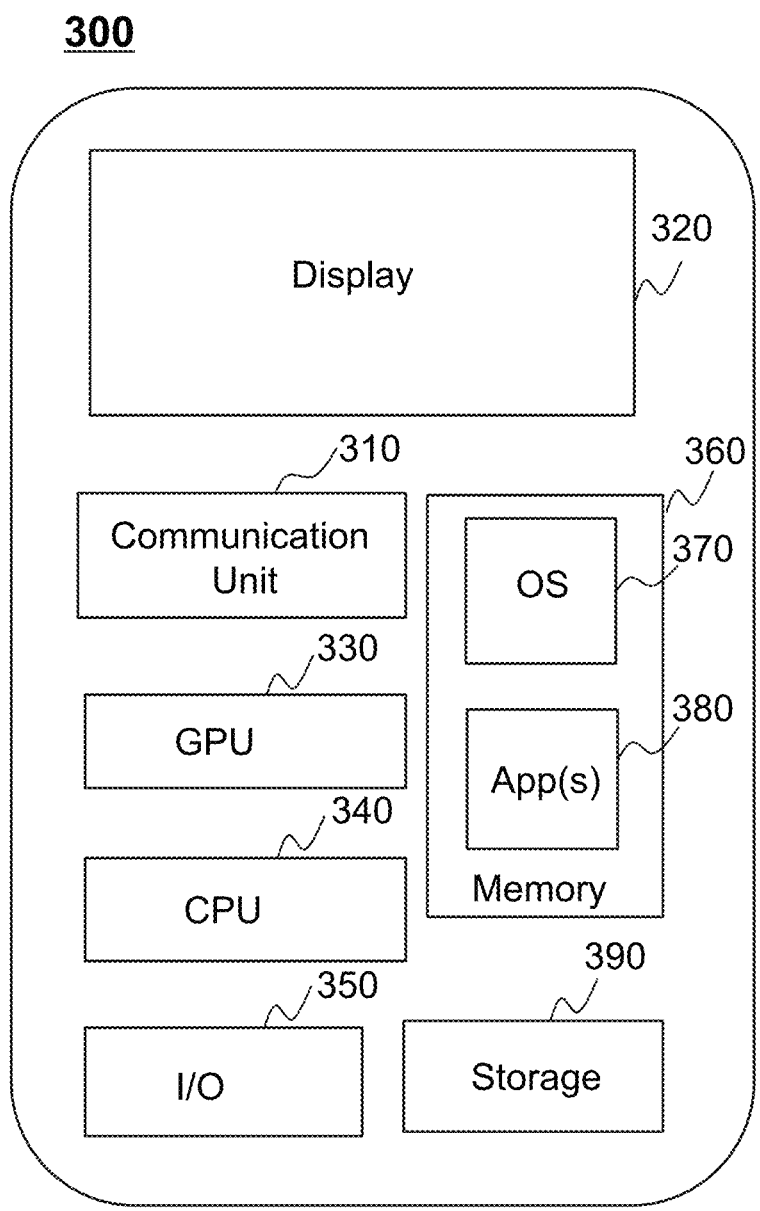
FIG. 3 is a schematic diagram illustrating exemplary hardware and/or software components of a mobile device according to some embodiments of the present disclosure.

FIG. 3 is a schematic diagram illustrating exemplary hardware and/or software components of an exemplary mobile device 300 on which the user terminal 130 may be implemented according to some embodiments of the present disclosure.

As illustrated in FIG. 3, the mobile device 300 may include a communication platform 310, a display 320, a graphic processing unit (GPU) 330, a central processing unit (CPU) 340, an I/O 350, a memory 360, and a storage 390. The CPU may include interface circuits and processing circuits similar to the processor 220. In some embodiments, any other suitable component, including but not limited to a system bus or a controller (not shown), may also be included in the mobile device 300. In some embodiments, a mobile operating system 370 (e.g., iOS™ Android™, Windows Phone™, etc.) and one or more applications 380 may be loaded into the memory 360 from the storage 390 in order to be executed by the CPU 340. The applications 380 may include a browser or any other suitable mobile apps for receiving and rendering information relating to the route planning service. User interactions with the information stream may be achieved via the I/O devices 350 and provided to the processing engine 112 and/or other components of the system 100 via the network 120.

To implement various modules, units, and their functionalities described in the present disclosure, computer hardware platforms may be used as the hardware platform(s) for one or more of the elements described herein (e.g., the system 100, and/or other components of the system 100 described with respect to FIGS. 1-10). The hardware elements, operating systems and programming languages of such computers are conventional in nature, and it is presumed that those skilled in the art are adequately familiar therewith to adapt those technologies to provide a reliability of passing time for a target candidate path as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

One of ordinary skill in the art would understand that when an element of the system 100 performs, the element may perform through electrical signals and/or electromagnetic signals. For example, when a server 110 processes a task, such as providing a reliability of passing time for a target candidate path, the server 110 may operate logic circuits in its processor to process such task. When the server 110 completes determining the reliability of passing time for the target candidate path, the processor of the server 110 may generate electrical signals encoding the target candidate path and the corresponding reliability. The processor of the server 110 may then send the electrical signals to at least one data exchange port of a target system associated with the server 110. The server 110 communicates with the target system via a wired network, the at least one data exchange port may be physically connected to a cable, which may further transmit the electrical signals to an input port (e.g., an information exchange port) of the user terminal 130. If the server 110 communicates with the target system via a wireless network, the at least one data exchange port of the target system may be one or more antennas, which may convert the electrical signals to electromagnetic signals. Within an electronic device, such as the user terminal 130, and/or the server 110, when a processor thereof processes an instruction, sends out an instruction, and/or performs an action, the instruction and/or action is conducted via electrical signals. For example, when the processor retrieves or saves data from a storage medium (e.g., the storage 140), it may send out electrical signals to a read/write device of the storage medium, which may read or write structured data in the storage medium. The structured data may be transmitted to the processor in the form of electrical signals via a bus of the electronic device. Here, an electrical signal may be one electrical signal, a series of electrical signals, and/or a plurality of discrete electrical signals.

Figure 4:
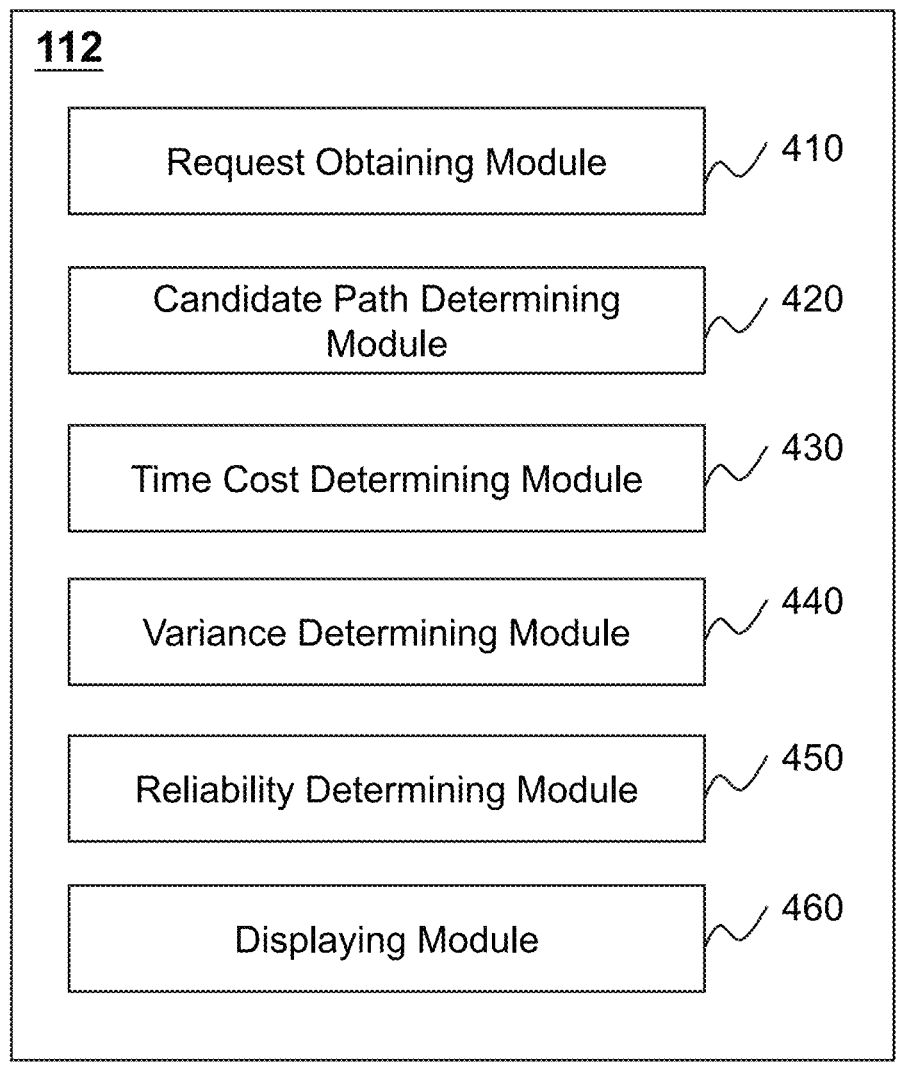
FIG. 4 is a block diagram illustrating an exemplary processing engine according to some embodiments of the present disclosure.

FIG. 4 is a block diagram illustrating an exemplary processing engine 112 according to some embodiments of the present disclosure. As illustrated in FIG. 4, the processing engine 112 may include a request obtaining module 410, a candidate path determining module 420, a time cost determining module 430, a variance determining module 440, a reliability determining module 450, and a displaying module 460.

The request obtaining module 410 may be configured to obtain a route planning request from a user terminal. The route planning request may include information such as a start time, a start location, an end location, an expected travel time cost, a travel mode, a driving history of a user of the user terminal, a profile information of the user, or the like, or any combination thereof. The start time may refer to a time when the user begins a trip from the start location to the end location. The expected travel time may refer to a maximum travel time cost that the user can accept as the user may have a strict requirement of arrival time. The information may be obtained from one or more components of the system 100 (e.g., the storage 140, the user terminal 130) or an external source that can communicate with the system 100.

The candidate path determining module 420 may be configured to determine a plurality of candidate paths for the route planning request. A candidate path may refer to a route with directions from the start location associated with the route planning request to the end location associated with the route planning request. A candidate path may include a plurality of links, and each link may represent a road segment of the candidate path. In some embodiments, the plurality of candidate paths may be historical routes from the start location to the end location that one or more users of the system 100 have ever traveled in the history. The historical routes may be stored in any storage (e.g., the storage 140) of the system 100. The candidate path determining module 420 may access the storage to obtain the plurality of candidate paths. In some embodiments, the plurality of candidate paths may be routes from the start location to the end location that are planned by an online electronic map. The candidate path determining module 420 may determine the plurality of candidate paths according to the online electronic map.

The time cost determining module 430 may be configured to determine an estimated travel time cost of a link and/or a candidate path. For example, the time cost determining module 430 may determine a first estimated travel time cost of each link of the plurality of links included in a target candidate path at a target time associated with the start time. In some embodiments, the target candidate path may be each path of the plurality of candidate paths or a portion of the plurality of candidate paths. The first estimated travel time cost of a link may refer to an estimated time that a vehicle associated with the user terminal will spend to pass through the link. The target time associated with the start time may refer to a time point that the vehicle associated with the user terminal may start to travel on the link. In some embodiments, the first estimated travel time cost of the link at the target time may be determined based on a historical travel time cost of the link at a historical target time corresponding to the target time and a current travel time cost on the link at the current time. More descriptions of determining the first estimated travel time cost of the link at a target time may be found elsewhere in the present disclosure (e.g., operation 530 in FIG. 5, FIGS. 6 and 9 and the descriptions thereof).

As another example, the time cost determining module 430 may determine a second estimated travel time cost of the target candidate path at the start time. In some embodiments, the second estimated travel time cost of the target candidate path may refer to an estimated time that a vehicle associated with the user terminal will spend to pass through the target candidate path. The second estimated travel time cost of the target candidate path may be determined based on a plurality of first estimated travel time costs of the plurality of links included in the target candidate path. More descriptions may be found elsewhere in the present disclosure (e.g., operation 540 in FIG. 5 and the descriptions thereof).

The variance determining module 440 may be configured to determine a variance associated with a link and/or a candidate path. For example, the variance determining module 440 may determine a first variance associated with each link of the plurality of links included in a target candidate path. In some embodiments, the first variance associated with the link may indicate a fluctuation around the first estimated travel time cost of the link or a stability of the first estimated travel time cost of the link. In some embodiments, the first variance may be determined based on a third variance associated with a historical travel time cost and a time interval between the target time and the current time. The third variance may indicate a fluctuation around the historical travel time cost of the link at a historical target time corresponding to the target time or a stability of the historical travel time cost of the link. More descriptions of determining the first variance and the third variance may be found elsewhere in the present disclosure (e.g., operation 530 in FIG. 5, FIGS. 7 and 8 and the descriptions thereof.

As another example, the variance determining module 440 may determine a second variance associated with the target candidate path. In some embodiments, the second variance associated with the target candidate path may indicate a fluctuation around the second estimated time cost of the target candidate path or a stability of the second estimated time cost of the target candidate path. In some embodiments, the second variance associated with the target candidate path may be determined based on a plurality of variances associated with the plurality of links included in the candidate path. More descriptions of determining the second variance may be found elsewhere in the present disclosure (e.g., operation 540 in FIG. 5 and the descriptions thereof.

The reliability determining module 450 may be configured to determine a reliability of passing time for the target candidate path. In some embodiments, the reliability of passing time may reflect a probability that a vehicle associated with the user terminal may pass through the target candidate path within a preset time period. In some embodiments, the processing engine 112 may construct a normal distribution by designating the second estimated travel time cost and the second variance as parameters of normal distribution. For example, the second estimated travel time cost may be a mean of the normal distribution and the second variance may be a variance of the normal distribution. The processing engine 112 may further determine the reliability of passing time for the target candidate path based on the constructed normal distribution and the preset time period. More descriptions of determining the reliability of passing time may be found elsewhere in the present disclosure (e.g., FIG. 10 and the descriptions thereof).

The displaying module 460 may be configured to send signals to the user terminal to direct the user terminal to display the target candidate path together with the corresponding second estimated travel time cost and the corresponding reliability of passing time on a user interface of the user terminal. In some embodiments, the displaying module 460 may direct the user terminal to display one or more target candidate paths together with the corresponding preset time periods and the corresponding reliabilities of passing time.

The modules in the processing engine 112 may be connected to or communicate with each other via a wired connection or a wireless connection. The wired connection may be a metal cable, an optical cable, a hybrid cable, or the like, or any combination thereof. The wireless connection may be a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units. For example, the time cost determining module 430 may be divided into two or more units for determining the first estimated travel time cost of the link, and determining the second of estimated travel time cost of the target candidate path, respectively. As another example, the processing engine 112 may include a storage module (not shown) used to store data and/or information relating to the route planning service.

Figure 5:
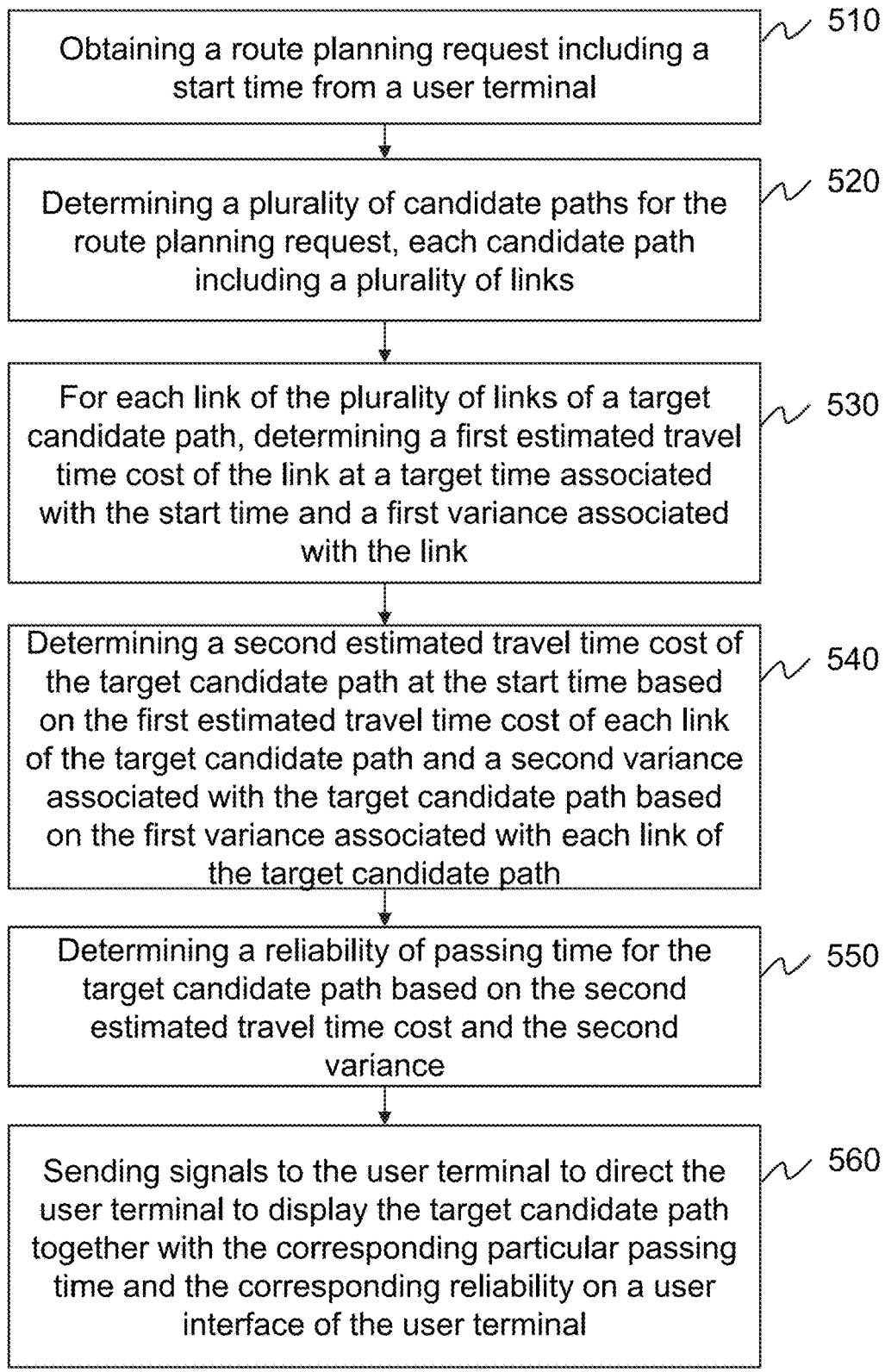
FIG. 5 is a flowchart illustrating an exemplary process for providing a reliability of passing time for a target candidate path in route planning according to some embodiments of the present disclosure.

FIG. 5 is a flowchart illustrating an exemplary process 500 for providing a reliability of passing time for a target candidate path in route planning according to some embodiments of the present disclosure. The process 500 may be executed by the system 100. For example, the process 500 may be implemented as a set of instructions (e.g., an application) stored in the storage ROM 230 or RAM 240. The processor 220 may execute the set of instructions, and when executing the instructions, it may be configured to perform the process 500. The operations of the illustrated process presented below are intended to be illustrative. In some embodiments, the process 500 may be accomplished with one or more additional operations not described and/or without one or more of the operations discussed. Additionally, the order in which the operations of the process as illustrated in FIG. 5 and described below is not intended to be limiting.

In 510, the processing engine 112 (e.g., the processor 220, the request obtaining module 410) may obtain a route planning request including a start time from a user terminal.

In some embodiments, the start time may refer to a time when a user of the user terminal begins a trip. The start time may be a current time or a future time set by a user of the user terminal. For example, the user may request for route planning when the user intends to begin the trip at the current time. The current time may refer to the present moment when the user sends the route planning request or a defined time reasonably close to the present moment for an ordinary person in the art (e.g., 1 minute, 2 minutes, or 5 minutes after the present moment). As another example, the user may request for route planning when the user intends to begin the trip at a future time. The future time may refer to a time reasonably long from the present moment for the ordinary person in the art (e.g., 30 minutes, 1 hour, 2 hours, or 1 day after the present moment). In some embodiments, the start time may be a default setting of the system 100 (e.g., the current time) if the user dose not set the start time.

As used herein, "obtaining a route planning request" may refer to "obtaining information related to the route planning request". The route planning request may be associated with a particular trip that the user intends to take. In some embodiments, the route planning request may include a start location and an end location associated with the particular trip. The start location or the end location may include name information, coordinates information, and/or address information, which may be set by the user. For example, the user may select or input the name and/or address of the start location or the end location on a user interface of the user terminal (e.g., the user terminal 130). In some embodiments, the route planning request may include the current location of the user (i.e., the current location of the user terminal) when the user sent the route planning request. The current location may be set as the start location by default if the user does not select or input the start location. In some embodiments, the route planning request may include an expected travel time cost for the route planning request set by the user. The expected travel time may refer to a travel time cost that the user wishes to travel as the user may or may not have a strict requirement of arrival time. For example, on some occasions, the arrival time is strict, such as when the user needs to catch a flight or train or to attend a meeting or an examination. In some embodiments, the route planning request may further include a travel mode (e.g., by driving a car, by hailing a car, by bicycle, or by walking), a driving history (e.g., historical travel routes, historical travel time, a count of historical travels, etc.) of the user that reflects his/her driving habits, profile information of the user (e.g., a gender, an age, contact information, a telephone number, an education level, an address, an occupation, a marriage state, a criminal record, a credit record, a traffic violation record, etc.), or the like, or any combination thereof.

In some embodiments, the information related to the route planning request may be obtained from one or more components of the system 100. Merely by way of example, information such as the start time, the start location, the end location, and the expected travel time cost may be inputted by the user via the user terminal and be transmitted to and/or stored in the storage 140. The processing engine 112 may retrieve the information from the storage 140 or obtain the information from the user terminal via the network 120. Additionally or alternatively, a portion of the information related to the route planning request may be obtained from an external source that can communicate with the system 100 via the network 120. For example, the profile information of the user may be obtained from one or more third-party applications that share the user information with the system 100. For example, the processing engine 112 may obtain the traffic violation record of the user from a website or a database of traffic violation records.

In 520, the processing engine 112 (e.g., the processor 220, the candidate path determining module 420) may determine a plurality of candidate paths for the route planning request. In some embodiments, each candidate path may include a plurality of links.

In some embodiments, a candidate path may refer to a route along which the user can travel from the start location to the end location of the route planning request. From the start location to the end location of the route planning request, there may be a plurality of candidate paths. In some embodiments, the plurality of candidate paths may be based on or selected from historical routes from the start location to the end location that one or more users of the system 100 have ever traveled in the history. The historical routes may be stored in any storage (e.g., the storage 140) of the system 100. The processing engine 112 may access the storage to obtain the plurality of candidate paths. In some embodiments, the plurality of candidate paths may be routes from the start location to the end location that are planned by an online electronic map. The processing engine 112 may determine the plurality of candidate paths based on the online electronic map according to a route planning algorithm. For example, the route planning algorithm may include a Dijkstra's algorithm, an A* algorithm, a Floyd-Warshall algorithm, a Johnson's algorithm, a steepest descent method, a neural network method, or the like, or any combination thereof.

In some embodiments, a link may be a road segment or a part of a road that has a certain direction. In some embodiments, a link may have a predetermined length. In some embodiments, the links may have varying lengths. In some embodiments, the predetermined length may be a default value stored in a storage device of the system 100 (e.g., the storage 140, the ROM 230, the RAM 240, etc.), or determined by the system 100 or an operator thereof according to different application scenarios. Two adjacent links in a candidate path may be connected by a common node. The common node may be an intersection that includes the two adjacent links or may be a virtual point that connects two (or more) links.

In 530, for each link of the plurality of links of a target candidate path, the processing engine 112 (e.g., the processor 220, the time cost determining module 430 and/or the variance determining module 440) may determine a first estimated travel time cost of the link at a target time associated with the start time and a first variance associated with the link.

In some embodiments, the processing engine 112 may select the target candidate path from the plurality of candidate paths from the start location to the end location. In some embodiments, the target candidate path may be any path of all of the plurality of candidate paths. For example, the processing engine 112 may, for each link of the plurality of links of each candidate path, determine the first estimated travel time cost of the link at a target time associated with the start time and the first variance associated with the link. As another example, the processing engine 112 may select one candidate path as the target candidate path. For example, the processing engine 112 may determine the target candidate path based on the expected travel time cost set by the user. Merely by way of example, each of the plurality of candidate paths may include a preliminary estimated travel time cost determined by an online electronic map. The processing engine 112 may select one or more candidate paths including preliminary estimated travel time costs that are equal to or less than the expected travel time cost as the target candidate path.

In some embodiments, the first estimated travel time cost of the link may refer to an estimated time that a vehicle associated with the user terminal will spend to pass through the link. The target time associated with the start time may refer to a time point that the vehicle associated with the user terminal may start to travel on the link. In some embodiments, at a first link (also referred to as a link at the beginning of the candidate path) of the candidate path, the target time may be the start time of the route planning request. At another link other than the first link of the candidate path, the target time may be an estimated time point calculated from the start time. Taking a candidate path including five links (denoted by l1, l2, l3, l4, l5 in order from the start location to the end location) as an example, the target time of link l1 may be the start time of the route planning request. The target time of link l2 may be determined based on the target time of link l1 and a first estimated time cost of link l1. When the start time is 9:00 am and the first estimated time cost of link l1 is 10 minutes, the target time of link l2 may be 9:10 am. The target time of links l3, l4 and l5 can be determined similarly as the target time of link l2, and is not be repeated here.

In some embodiments, the first estimated travel time costs of the link at different target times may be different. For example, a first estimated travel time cost of the link at 8:00 am on a weekday (e.g., any day from Monday to Friday) may be more than a first estimated travel time cost at 10:00 am on the weekday because 8:00 am on a weekday is within a morning rush. As another example, a first estimated travel time cost of the link at 11:00 am on a weekday may be less than a first estimated travel time cost at 11:00 am on a weekend (e.g., a day of Saturday or Sunday) because more people may travel for entertainment on weekends than weekdays.

In some embodiments, the processing engine 112 may determine the first estimated travel time cost of the link at the target time based on a historical travel time cost of the link at a historical target time corresponding to the target time and a current travel time cost on the link at the current time. The historical travel time cost of the link at the historical target time may be determined based on a plurality of historical travel time costs of the link at a plurality of historical target times in past periods (e.g., the past week, the past month) by statistical algorithms, such as but not limited to an arithmetic mean algorithm, a weighted average algorithm, a sampling statistic algorithm, or the like, or any combination thereof. The current travel time cost on the link at the current time may be determined based on a plurality of travel time costs on the link associated with the current time by statistical algorithms, such as but not limited to an arithmetic mean algorithm, a weighted average algorithm, a sampling statistic algorithm, or the like, or any combination thereof. In some embodiments, the first estimated travel time cost of each link may be a normal distribution. It should be noted that normal distribution is only for illustration purpose, the first estimated travel time cost may be any other distributions, such as a chi-square distribution, an f-distribution, etc. More descriptions of determining the estimated travel time cost of the link at a target time may be found elsewhere in the present disclosure (e.g., FIGS. 6 and 9 and the descriptions thereof).

In some embodiments, the first variance associated with the link may indicate a fluctuation around the first estimated travel time cost of the link or a stability of the first estimated travel time cost of the link. The smaller the first variance is, the more stable the first estimated travel time cost or the less fluctuating around the first estimated travel time cost may be. For example, if the first variance associated with a link is small, a vehicle associated with the user terminal may pass through the link within the first estimated travel time cost (or within a predetermined range around the first estimated travel time cost) in most cases. As another example, if the first variance associated with the link is large, the vehicle associated with the user terminal may pass through the link within the first estimated travel time cost (or within a predetermined range around the first estimated travel time cost) sometimes, and either within a time far larger than the first estimated travel time cost or within a time far less than the first estimated travel time cost. In some embodiments, the first variance may be determined based on a third variance associated with a historical travel time cost and a time interval between the target time and the current time. More descriptions of determining the first variance associated with the link may be found elsewhere in the present disclosure (e.g., FIG. 7 and the descriptions thereof).

In 540, the processing engine 112 (e.g., the processor 220, the time cost determining module 430 and/or the variance determining module 440) may determine a second estimated travel time cost of the target candidate path at the start time based on the first estimated travel time cost of each link of the target candidate path and a second variance associated with the target candidate path based on the first variance associated with each link of the target candidate path.

In some embodiments, the second estimated travel time cost of the target candidate path may refer to an estimated time that a vehicle associated with the user terminal will spend to pass through the target candidate path. The second estimated travel time cost of the target candidate path may be determined based on a plurality of first estimated travel time costs of the plurality of links included in the target candidate path. For example, a sum of the first estimated travel time cost of each of the plurality of links of the target candidate path may be designated as the second estimated travel time cost of the target candidate path. Taking a target candidate path including five links as an example, the first estimated travel time cost of each link of the five links may be denoted by $u_1^n$, $u_2^n$, $u_3^n$, $u_4^n$, and $u_5^n$. The second estimated travel time cost of the target candidate path may be a sum of $u_1^n$, $u_2^n$, $u_3^n$, $u_4^n$, and $u_5^n$.

In some embodiments, the second variance associated with the target candidate path may indicate fluctuation around the second estimated time cost of the target candidate path or a stability of the second estimated time cost of the target candidate path. The smaller the second variance is, the more stable the second estimated travel time cost or the less fluctuating around the second estimated travel time cost may be. For example, if the second variance associated with the target candidate path is small, a vehicle associated with the user terminal may pass through the target candidate path within the second estimated travel time cost (or within a predetermined range around the second estimated travel time cost) in most cases. As another example, if the second variance associated with the target candidate path is large, the vehicle associated with the user terminal may pass through the link within the second estimated travel time cost (or within a predetermined range around the second estimated travel time cost) sometimes, and either within a time far larger than the second estimated travel time cost or within a time far less than the second estimated travel time cost sometimes. In some embodiments, the second variance associated with the target candidate path may be determined based on a plurality of variances associated with the plurality of links of the candidate path. For example, a sum of the first variance of each of the plurality of links included in the target candidate path may be designated as the second variance associated with the target candidate path. Taking a target candidate path including five links as an example, the first variance of each link of the five links may be denoted by $(\sigma_1')^2$, $(\sigma_2')^2$, $(\sigma_3')^2$, $(\sigma_4')^2$, and $(\sigma_5')^2$. The second variance associated with the target candidate path may be a sum of $(\sigma_1')^2$, $(\sigma_2')^2$, $(\sigma_3')^2$, $(\sigma_4')^2$, and $(\sigma_5')^2$.

In 550, the processing engine 112 (e.g., the processor 220, the reliability determining module 450) may determine a reliability of passing time for the target candidate path based on the second estimated travel time cost and the second variance.

In some embodiments, the reliability of passing time may reflect a probability that a vehicle associated with the user terminal may pass through the target candidate path within a particular passing time. In some embodiments, the particular passing time may be the expected travel time cost set by the user. In some embodiments, the particular passing time may be a time determined by specific conditions. For example, the particular passing time may be determined based on the second estimated travel time cost and one or more specific rules (e.g., the particular passing time is the second estimated travel time cost or a time cost that is smaller/greater than the second estimated travel time cost). Merely by way of example, the particular passing time may be greater than the second estimated travel time cost by a preset value (e.g., 10 minutes, 15 minutes) or a preset percent (e.g., 10%, 15%, 20%) of the second estimated travel time cost. For example, the second estimated travel time cost of the target candidate path is 45 minutes. The processing engine 112 may determine a reliability that reflects a probability that a vehicle associated with the user terminal may pass through the target candidate path within 55 minutes. In some embodiments, the particular passing time may be determined according to other candidate paths that are recommended to the user. For example, the processing engine 112 may recommend three candidate paths to the user, such as a first path with a shortest traveling distance, a second path with a shortest passing time cost, a more reliable third path than both the first path and the second path. The processing engine 112 may determine a reliability of passing time for the first path (e.g., the first path, 45 minutes, 65%)

and the second path (e.g., the second path, 43 minutes, 50%), respectively. The processing engine 112 may determine the particular passing time of the third path that has a largest reliability among the reliabilities of passing time for the three candidate paths. The particular passing time may be 50 minutes with a reliability of 80%.

In some embodiments, the processing engine 112 may construct a normal distribution by designating the second estimated travel time cost and the second variance as parameters (e.g., a mean and a variance, respectively) of the normal distribution. The processing engine 112 may further determine the reliability of passing time for the target candidate path based on the constructed normal distribution and the particular passing time. More descriptions of determining the reliability of passing time may be found elsewhere in the present disclosure (e.g., FIG. 10 and the descriptions thereof).

In 560, the processing engine 112 (e.g., the processor 220, the displaying module 440) may send signals to the user terminal to direct the user terminal to display the target candidate path together with the corresponding particular passing time and the corresponding reliability of passing time on a user interface of the user terminal.

In some embodiments, when the user sends the route planning request by an online to offline application (e.g. an on-demand car service application or a route planning application) installed on the user terminal, the user terminal may receive at least one target candidate path, and the user interface of the route planning application may display the second estimated travel time cost and the reliability of passing time corresponding to the at least one target candidate path.

In some embodiments, for a route planning request corresponding to one or more target candidate path, the processing engine 112 may direct the user terminal to display second estimated travel time costs and reliabilities of passing time of all of the one or more target candidate paths. In some embodiments, the processing engine 112 may direct the user terminal to display the reliability of passing time associated with only one target candidate path, the only one target candidate path including the greatest reliability of passing time in comparison with that associated with the one or more target candidate paths. For example, the processing engine 112 may direct the user terminal to display three target candidate paths (e.g., a first path with a shortest traveling distance, a second path that costs a shortest travel time, and a third path with a greater reliability of passing time than both the first path and the second path).

In some embodiments, after displaying the candidate paths with the reliabilities of passing time, the user terminal may be used to provide feedbacks from the user for selecting a candidate path. In some embodiments, the processing engine 112 may receive a feedback from the user, wherein the feedback includes selection of a candidate path; the processing engine 112 may send further signals to the user terminal and direct the user terminal to change the display to focus on the selected path; alternatively or additionally, the processing engine 112 may send further signals to the user terminal and direct the user terminal to display further inquiries to the user (e.g. more confirmation is needed, etc.).

In some embodiments, in addition to displaying the candidate paths with the reliabilities of passing time, the user terminal may be directed, by signals from the processing engine, to display recommendations regarding the candidate paths, based on the passing time, the reliabilities of the passing time, and a determination regarding the weight the user may put on time cost and reliability. For example, when the end location or destination is a public transportation hub (e.g. train station or airport), it is more likely that the user puts more weight on reliability of passing time. Accordingly, in some embodiments, the processing engine 112 may determine to recommend a candidate path that has a higher reliability for a particular passing time.

It should be noted that the above description is merely provided for the purposes of illustration, and not intended to limit the scope of the present disclosure. For persons having ordinary skills in the art, multiple variations and modifications may be made under the teachings of the present disclosure. For example, operation 530 may be divided into two steps for determining the first estimated travel time cost and the first variance, respectively. As another example, operation 540 may be divided into two steps for determining the second estimated travel time cost and the second variance, respectively. As still another example, other alternatives do exist and other factors may be taken into consideration in the determination of the target path. However, those variations and modifications do not depart from the scope of the present disclosure.

Figure 6:
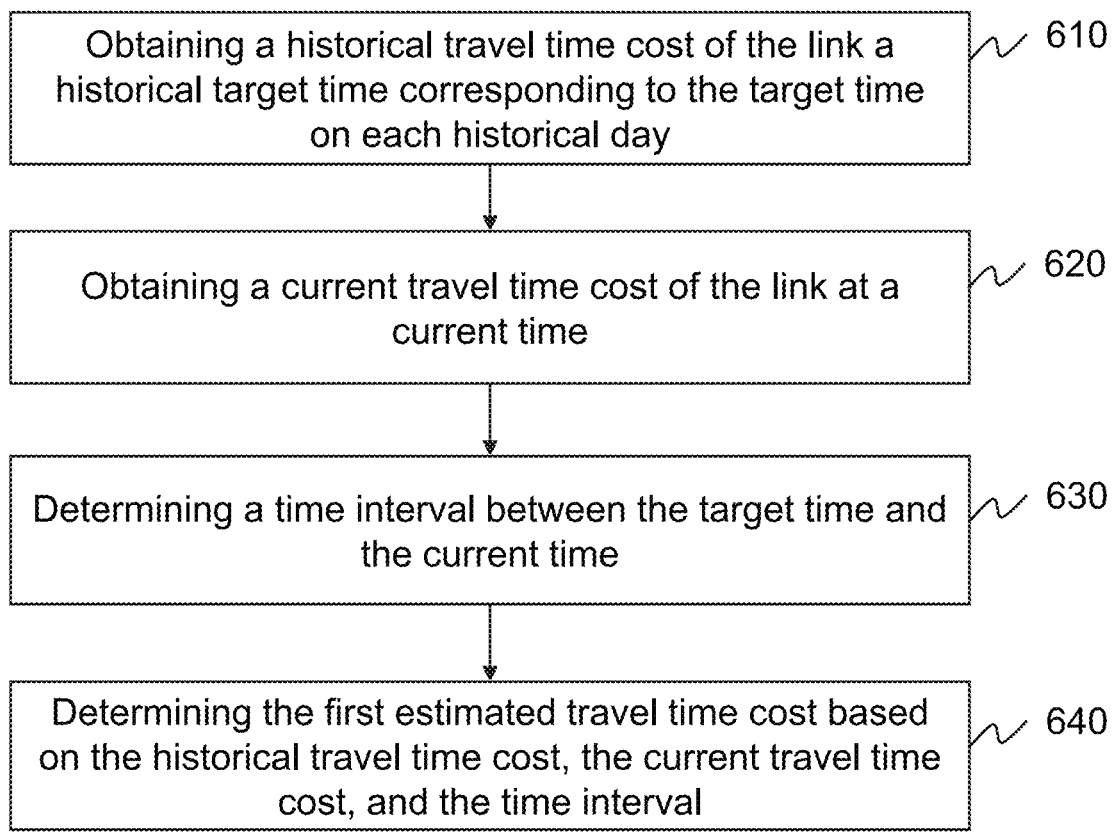
FIG. 6 is a flowchart illustrating an exemplary process for determining a first estimated travel time cost of a link according to some embodiments of the present disclosure.

FIG. 6 is a flowchart illustrating an exemplary process 600 for determining a first estimated travel time cost of a link according to some embodiments of the present disclosure. The process 600 may be executed by the system 100. For example, the process 600 may be implemented as a set of instructions (e.g., an application) stored in the storage ROM 230 or RAM 240. The processor 220 may execute the set of instructions, and when executing the instructions, it may be configured to perform the process 600. The operations of the illustrated process presented below are intended to be illustrative. In some embodiments, the process 600 may be accomplished with one or more additional operations not described and/or without one or more of the operations discussed. Additionally, the order in which the operations of the process as illustrated in FIG. 6 and described below is not intended to be limiting.

In 610, the processing engine 112 (e.g., the processor 220, the time cost determining module 430) may obtain a historical travel time cost of the link at the historical target time corresponding to the target time on each historical day.

In some embodiments, the historical travel time cost may be a time cost that a vehicle spent to pass through the link at a historical target time that is similar to the target time on every day in the history (or on each historical day in a predetermined period of time in the history). In some embodiments, the historical travel time cost may be determined based on a plurality of travel time costs that a plurality of vehicles spent to pass through the link within a predetermined period of time before the historical target time (e.g., within 5 minutes, within 10 minutes, etc.) by statistical algorithms, such as but not limited to an arithmetic mean algorithm, a weighted average algorithm, a sampling statistic algorithm, or the like, or any combination thereof. For example, the historical target time is 9:00 am and the predetermined period of time is 10 minutes. The processing engine 112 may obtain travel time costs of a plurality of vehicles traveling through the link from 8:50 am to 9:00 am on each day of the past several historical days (e.g., past 50 days, past 30 weekdays, past 30 weekends, etc.) from one or more components of the system 100 (e.g., the storage 140). The processing engine 112 may determine an average value of the obtained travel time costs of the link as the historical travel time cost at 9:00 am. In some embodiments, the predetermined period of time may be a default value stored in a storage (e.g., the storage 140) of the system 100, or be dynamically determined according to different situations.

In 620, the processing engine 112 (e.g., the processor 220, the time cost determining module 430) may obtain a current travel time cost on the link at the current time.

In some embodiments, the current travel time cost may be an average time cost that a vehicle spends to pass through the link at the current time. The current travel time cost at the current time may be determined based on an average time cost of travel time costs within a preset time period before the current time. For example, if the current time is 8:30 am and the preset time period is 10 minutes, the processing engine 112 may obtain travel time costs on the link from 8:20 to 8:30. The processing engine 112 may determine an average of the travel time costs as the current travel time cost at the current time. In some embodiments, the preset time period may be a default value stored in a storage (e.g., the storage 140) of the system 100, or be dynamically determined according to different situations.

In 630, the processing engine 112 (e.g., the processor 220, the time cost determining module 430) may determine a time interval between the start time and the current time.

In some embodiments, the time interval between the start time and the current time may be measured in different dimensions (e.g., minutes or hours). For example, if the start time is 8:30 am today and the current time is 8:00 am today, the time interval between the start time and the current time may be 30 minutes or 0.5 hours. As another example, if the start time is 23:00 on Monday and the current time is 7:00 am on Monday, the time interval between the start time and the current time may be 480 minutes or 8 hours.

In 640, the processing engine 112 (e.g., the processor 220, the time cost determining module 430) may determine the first estimated travel time cost based on the historical travel time cost, the current travel time cost, and the time interval.

In some embodiments, the processing engine 112 may determine whether the time interval is less than a predetermined interval (e.g., 60 minutes, 2 hours). In some embodiments, the predetermined interval may be a default value stored in a storage (e.g., the storage 140) of the system 100, or be dynamically determined according to different situations. In response to a determination that the time interval is less than the predetermined interval, the processing engine 112 may determine the first estimated travel time cost based on the historical travel time cost and the current travel time cost. In response to the determination that the time interval is greater than or equal to the predetermined interval, the processing engine 112 may determine the first estimated travel time cost only based on the historical travel time cost. For example, the processing engine 112 may determine the first estimated travel time cost according to Equation (1) below:

$$u_i^{t'} = \theta \frac{1}{|H|} \sum_H C_i^t + (1-\theta)C_i^c, \quad (1)$$

where $\mu_i^n$ refers to the first estimated travel time cost of a i-th link at the target time associated with the start time, $c_i^t$ refers to a historical travel time cost of the i-th link at the historical target time corresponding to the target time on each historical day in a predetermined period of time in the history, $c_i^c$ refers to the current travel time cost of the i-th link at the current time, |H| refers to a count of historical days in the predetermined period of time in the history, and $$\theta = \min\left\{1, \frac{t_f}{\alpha}\right\},$$

which refers to a minimum value between 1 and $$\frac{t_f}{\alpha},$$

wherein $t_f$ refers to the time interval between the start time and the current time, and $\alpha$ refers to the predetermined interval, $t_f$ and $\alpha$ having the same measurement dimension (e.g., both in minutes or hours). For example, the predetermined interval ($\alpha$) is 60 minutes, if the time interval ($t_f$) is greater than or equal to 60 minutes (e.g., 80 minutes), the processing engine 112 may determine $\theta$ as 1, and the first estimated travel time cost as $$u_i^{t'} = \theta \frac{1}{|H|} \sum_H C_i^t.$$

The first estimated travel time cost may be determined only based on the historical travel time cost $c_i^t$. As another example, if the time interval ($t_f$) is less than 60 minutes (e.g., 30 minutes), the processing engine 112 may determine $\theta$ as an $$\frac{t_f}{\alpha} = \frac{30}{60},$$

and the first estimated travel time cost as $$u_i^{t'} = \theta \frac{1}{|H|} \sum_H C_i^t + (1-\theta)C_i^c.$$

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more other optional operations (e.g., a storing operation) may be added elsewhere in the exemplary process 600.

Figure 7:
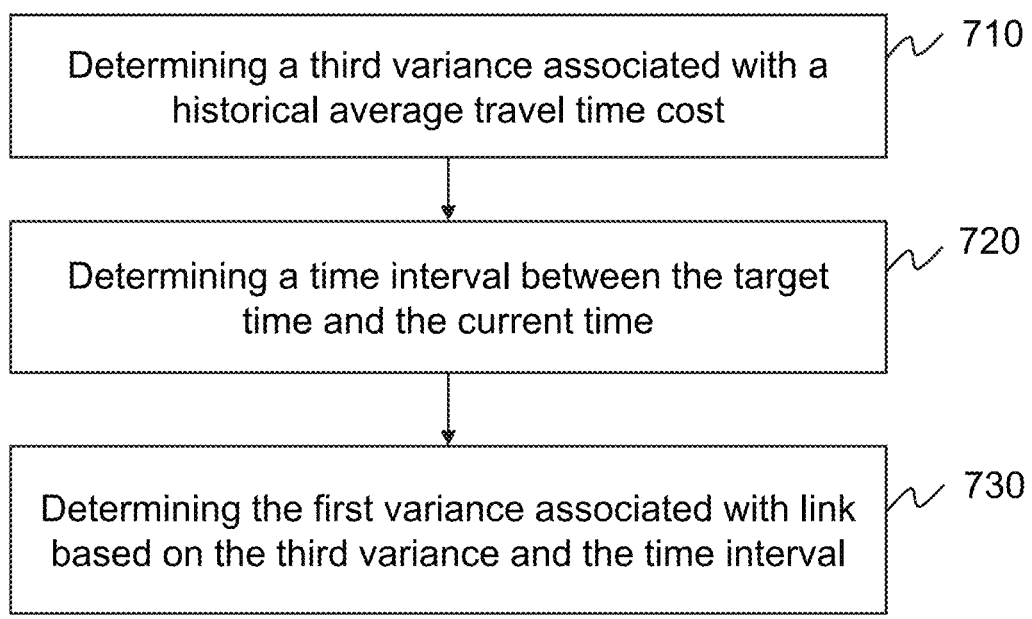
FIG. 7 is a flowchart illustrating an exemplary process for determining a first variance associated a link according to some embodiments of the present disclosure.

FIG. 7 is a flowchart illustrating an exemplary process 700 for determining a first variance associated a link according to some embodiments of the present disclosure. The process 700 may be executed by the system 100. For example, the process 700 may be implemented as a set of instructions (e.g., an application) stored in the storage ROM 230 or RAM 240. The processor 220 may execute the set of instructions, and when executing the instructions, it may be configured to perform the process 700. The operations of the illustrated process presented below are intended to be illustrative. In some embodiments, the process 700 may be accomplished with one or more additional operations not described and/or without one or more of the operations discussed. Additionally, the order in which the operations of the process as illustrated in FIG. 7 and described below is not intended to be limiting.

In 710, the processing engine 112 (e.g., the processor 220, the variance determining module 440) may determine a third variance associated with a historical average travel time cost.

In some embodiments, the historical average travel time cost may be an average time cost that a plurality of historical vehicles spent to pass through the link at the historical target time same with the target time in a predetermined period of time in the history. In some embodiments, the historical average travel time cost may be determined based on a plurality of historical travel time costs of the link at a plurality of historical target times within the predetermined period of time in the history (e.g., within the past week, within the past month, etc.) by statistical algorithms, such as but not limited to an arithmetic mean algorithm, a weighted average algorithm, a sampling statistic algorithm, or the like, or any combination thereof.

In some embodiments, the third variance associated with the historical average travel time cost may indicate a fluctuation around a historical average travel time cost of the link at a historical target time corresponding to the target time or a stability of the historical average travel time cost of the link. The smaller the third variance is, the more stable of the historical average travel time cost or the less fluctuating around the historical average travel time cost may be. For example, if the third variance associated is small, a vehicle associated with the user terminal may pass through the corresponding link within the historical average travel time cost (or within a predetermined range around the historical average travel time cost) in most cases. As another example, if the third variance is large, the vehicle associated with the user terminal may pass through the link within the historical average travel time cost (or within a predetermined range around the historical average travel time cost) sometimes, and either within a time far more larger than the historical average travel time cost or within a time far more less than the historical average travel time cost sometimes. In some embodiments, the third variance may be determined based on differences between each historical travel time cost of the plurality of historical travel time costs of the link at the plurality of historical target time on each historical day in past periods and the historical average travel time cost of the link at the historical target time corresponding to the target time. More descriptions of determining the third variance may be found elsewhere in the present disclosure (e.g., FIG. 8 and the descriptions thereof).

In 720, the processing engine 112 (e.g., the processor 220, the variance determining module 440) may determine a time interval between the target time and the current time.

In some embodiments, the time interval between the start time and the current time may be measured in different dimensions (e.g., minutes or hours). For example, if the start time is 8:30 am today and the current time is 8:00 am today, the time interval between the start time and the current time may be 30 minutes or 0.5 hours. As another example, if the start time is 23:00 on Monday and the current time is 7:00 am on Monday, the time interval between the start time and the current time may be 480 minutes or 8 hours.

In 730, the processing engine 112 (e.g., the processor 220, the variance determining module 440) may determine the first variance associated with link based on the third variance and the time interval.

In some embodiments, the processing engine 112 may determine whether the time interval is less than a predetermined interval (e.g., 60 minutes, 2 hours). In some embodiments, the predetermined interval may be a default value stored in a storage (e.g., the storage 140) of the system 100, or be dynamically determined according to different situations. In response to a determination that the time interval is less than the predetermined interval, the processing engine 112 may determine the first variance based on the third variance and the time interval. In response to a determination that the time interval is greater than or equal to the predetermined interval, the processing engine 112 may determine the first variance only based on the third variance. For example, the processing engine 112 may determine the first variance according to Equation (2) below:

$$(\sigma_i^f)^2 = \theta^2 \sigma_i^2 \tag{2}$$

where $(\sigma_i^f)^2$ refers to the first variance associated with a i-th link, $\sigma_i^2$ refers to the third variance associated with the i-th link, and $$\theta = \min\left\{1, \frac{t_f}{\alpha}\right\},$$

which refers to a minimum value between 1 and $$\frac{t_f}{\alpha},$$

wherein $t_f$ refers to me time interval between the start time and the current time, and $\alpha$ refers to the predetermined interval, $t_f$ and $\alpha$ having the same measurement dimension (e.g., both in minutes or hours). For example, the predetermined interval ($\alpha$) is 60 minutes, if the time interval ($t_f$) is greater than or equal to 60 minutes (e.g., 80 minutes), the processing engine 112 may determine $\theta$ as 1, and the first variance as $(\sigma_i^f)^2 = \sigma_i^2$. The first estimated travel time cost may be determined only based on the historical travel time cost $u_i^t$. As another example, if the time interval ($t_f$) is less than 60 minutes (e.g., 30 minutes), the processing engine 112 may determine $\theta$ as $$\frac{t_f}{\alpha} = \frac{30}{60},$$

and the first estimated travel time cost as $(\sigma_i^f)^2 = \theta^2 \sigma_i^2$.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more other optional operations (e.g., a storing operation) may be added elsewhere in the exemplary process 700.

FIG. 8 is a flowchart illustrating an exemplary process 800 for determining a third variance associated with a historical average travel time cost according to some embodiments of the present disclosure. The process 800 may be executed by the system 100. For example, the process 800 may be implemented as a set of instructions (e.g., an application) stored in the storage ROM 230 or RAM 240. The processor 220 may execute the set of instructions, and when executing the instructions, it may be configured to perform the process 800. The operations of the illustrated process presented below are intended to be illustrative. In some embodiments, the process 800 may be accomplished with one or more additional operations not described and/or without one or more of the operations discussed. Additionally, the order in which the operations of the process as illustrated in FIG. 8 and described below is not intended to be limiting.

In 810, the processing engine 112 (e.g., the processor 220, the variance determining module 440) may obtain a historical average travel time cost of the link at a historical target time corresponding to the target time.

In some embodiments, the historical average travel time cost may be an average time cost that a plurality of historical vehicles spent to pass through the link at the historical target times that are similar to the target time in a predetermined period of time in the history. In some embodiments, the processing engine 112 may determine the historical average travel time cost based on a plurality of historical travel time costs of the link at a plurality of historical target times within the predetermined period of time in the history. Taking the target time of 9:00 am on Monday this week as an example, the processing engine 112 may obtain historical travel time costs of the link at 9:00 on every historical day (e.g., every Monday, every weekday) within 30 days in the history directly from one or more components of the system 100 (e.g., the storage 140). The processing engine 112 may determine an average value of the obtained historical travel time costs of the link as the average historical travel time cost. More descriptions of determining the historical average travel time cost may be found elsewhere in the present disclosure (e.g., FIG. 9 and the descriptions thereof).

In 820, the processing engine 112 (e.g., the processor 220, the variance determining module 440) may obtain a historical travel time cost of the link at the historical target time on each historical day.

In some embodiments, a historical day may be a weekday or a weekend within the predetermined period of time in history. For example, the processing engine 112 may determine whether the target time is on a weekday or weekend. In response to a determination that the target time is on a weekday, the processing engine 112 may obtain the historical travel time cost of the link at the historical target time on each historical weekday within the predetermined period of time in history. In response to a determination that the target time is on a weekend, the processing engine 112 may obtain the historical travel time cost of the link at the historical target time on each historical weekend within the predetermined period of time in history. In some embodiments, the processing engine 112 may obtain the historical travel time cost of the link at the historical target time on each historical day directly from one or more components of the system 100 (e.g., the storage 140).

In 830, the processing engine 112 (e.g., the processor 220, the variance determining module 440) may determine the third variance based on the historical average travel time cost and the historical travel time cost of the link at the historical target time on each historical day.

In some embodiments, the third variance may be determined based on differences between the historical travel time cost of the link at the historical target time on each historical day and the historical average travel time cost. For example, the processing engine 112 may determine the third variance according to Equation (3) below:

$$\sigma_i^2 = \frac{1}{|H|} \sum_H (C_i^t - u_i^t)^2, \quad (3)$$

where $\sigma_i^2$ refers to the third variance associated with a i-th link, H refers to a count of historical days within the predetermined period of time in the history, $c_i^t$ refers to a historical travel time cost of the i-th link at the historical target time on a historical day, and $u_i^t$ refers to the average historical travel time of the i-th link at the historical target time. For example, the processing engine 112 may obtain each historical travel time cost of the link at the historical target time on each weekdays of Monday to Thursday in this week and Friday in last week and the historical average travel time cost of the five historical days, and determine the third variance according to Equation (2).

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional operations (e.g., a storing operation) may be added elsewhere in the exemplary process 800.

Figure 9:
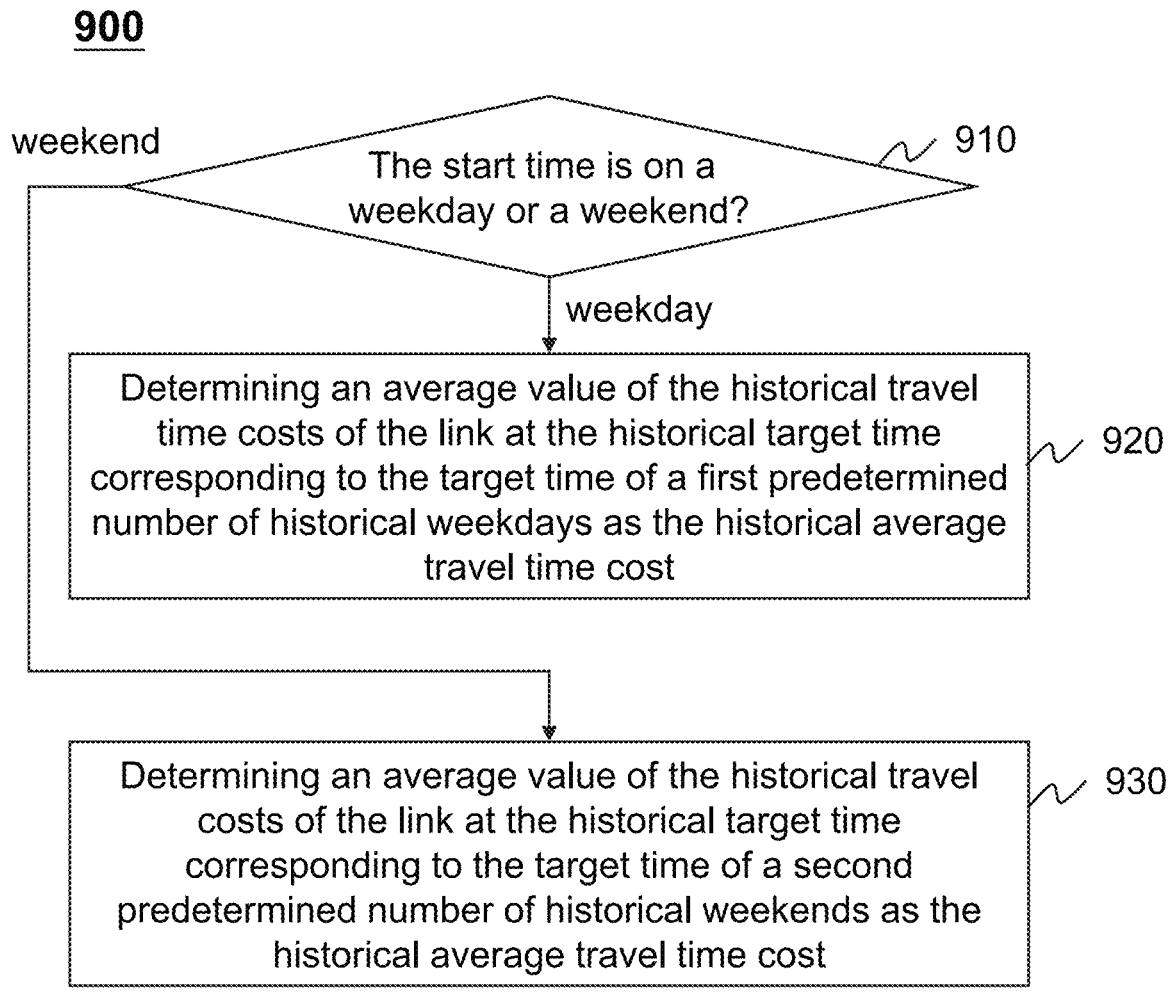
FIG. 9 is a flowchart illustrating an exemplary process for determining a historical average travel time cost according to some embodiments of the present disclosure.

FIG. 9 is a flowchart illustrating an exemplary process 900 for determining a historical average travel time cost according to some embodiments of the present disclosure. The process 900 may be executed by the system 100. For example, the process 900 may be implemented as a set of instructions (e.g., an application) stored in the storage ROM 230 or RAM 240. The processor 220 may execute the set of instructions, and when executing the instructions, it may be configured to perform the process 900. The operations of the illustrated process presented below are intended to be illustrative. In some embodiments, the process 900 may be accomplished with one or more additional operations not described and/or without one or more of the operations discussed. Additionally, the order in which the operations of the process as illustrated in FIG. 9 and described below is not intended to be limiting.

In 910, the processing engine 112 (e.g., the processor 220, the time cost determining module 430) may determine that the start time is on a weekday or a weekend.

In some embodiments, the weekday may be a day that a large number of people are at work, and the weekend may be a day that a large number of people are on leave or on holiday. For example, the weekday may be a default setting of any day from Monday to Friday, and the weekend may be a default setting of a day of Saturday or Sunday. As another example, the weekday may not include a day belongs to legal holidays even the day is from Monday to Friday and the day may be set as a weekend.

In 920, in response to a determination that the start time is on a weekday, the processing engine 112 (e.g., the processor 220, the time cost determining module 430) may determine an average value of the historical travel time costs of the link at the historical target time corresponding to the target time of a first predetermined count of historical weekdays as the historical average travel time cost.

In some embodiments, the first predetermined count of historical weekdays may include a first predetermined count of consecutive weekdays before the weekday that the start time is on. For example, if the first predetermined count is 5 and the weekday that the start time is on is Friday in this week, the historical weekdays may include four days from Monday to Thursday in this week and a day of Friday in last week. In some embodiments, the first predetermined count may be a default value stored in a storage (e.g., the storage 140) of the system 100, or be dynamically determined according to different situations.

In some embodiments, the processing engine 112 may obtain historical travel time cost of the link at the historical target time for each historical weekday from one or more components of the system 100 (e.g., the storage 140). The processing engine 112 may determine the average value of historical travel time costs of the link at the historical target time of the first predetermined count of historical weekdays. The processing engine 112 may designate the average value of the historical travel time costs as the historical average travel time cost. For example, the processing engine 112 may determine the historical average travel time cost of the link at the historical target time according to Equation (4) below:

$$u_i^t = \frac{1}{|H|} \sum_H c_i^t, \qquad (4)$$

where $u_i^t$ refers to the historical average travel time cost of a i-th link at the historical target time, H refers to the first predetermined count of historical weekdays, $c_i^t$ refers to a historical travel time cost of a historical weekday, and $\Sigma_H c_i^t$ refers to a sum of historical travel time costs of the historical weekdays. For example, the processing engine 112 may obtain each historical travel time cost of the link at the historical target time on each weekday of Monday to Thursday in this week and Friday in last week, and determine the average travel time cost of these weekdays according to Equation (4).

In 930, in response to a determination that the start time is on a weekend, the processing engine 112 (e.g., the processor 220, the time cost determining module 430) may determine an average value of the historical travel time costs of the link at the historical target time corresponding to the target time of a second predetermined count of historical weekends as the historical average travel time cost.

In some embodiments, the second predetermined count of historical weekends may include a second predetermined count of consecutive weekends before the weekend that the start time is on. For example, if the second predetermined count is 5 and the weekend that the start time is on is Sunday in this week, the historical weekends may include a day of Saturday in this week, two days of Saturday and Sunday in last week, and two days of Saturday and Sunday in the week before last week. In some embodiments, the second predetermined count may be a default value stored in a storage (e.g., the storage 140) of the system 100, or be dynamically determined according to different situations. In some embodiments, the second predetermined count may be the same as or different from the first predetermined count.

In some embodiments, the processing engine 112 may obtain historical travel time cost of the link at the historical target time for each historical weekend from one or more components of the system 100 (e.g., the storage 140). The processing engine 112 may determine the average value of historical travel time costs of the link at the historical target time of the second predetermined count of historical weekends, which is similar to Equation (2). The processing engine 112 may designate the average value of the historical travel time costs as the historical average travel time cost. For example, the processing engine 112 may obtain each historical travel time cost of the link at the historical target time on each weekend of Saturday in this week, Saturday and Sunday in last week, and two days of Saturday and Sunday in the week before the last week, and determine the average travel time cost of these weekends according to Equation (2).

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional operations (e.g., a storing operation) may be added elsewhere in the exemplary process 900.

FIG. 10 is a flowchart illustrating an exemplary process 1000 for determining a reliability of passing time for a target candidate path according to some embodiments of the present disclosure. The process 1000 may be executed by the system 100. For example, the process 1000 may be implemented as a set of instructions (e.g., an application) stored in the storage ROM 230 or RAM 240. The processor 220 may execute the set of instructions, and when executing the instructions, it may be configured to perform the process 1000. The operations of the illustrated process presented below are intended to be illustrative. In some embodiments, the process 1000 may be accomplished with one or more additional operations not described and/or without one or more of the operations discussed. Additionally, the order in which the operations of the process as illustrated in FIG. 10 and described below is not intended to be limiting.

In 1010, the processing engine 112 (e.g., the processor 220, the reliability determining module 450) may construct a normal distribution based on the second estimated travel time cost and the second variance. In some embodiments, the second estimated travel time cost may be a mean of the normal distribution and the second variance may be a variance of the normal distribution.

In 1020, the processing engine 112 (e.g., the processor 220, the reliability determining module 450) may determine the reliability of passing time for the target candidate path based on the constructed normal distribution. As described in connection with operation 550, the reliability of passing time may reflect a probability that a vehicle associated with the user terminal may pass through the target candidate path within a particular passing time.

In some embodiments, the reliability of passing time for the target candidate path may be determined based on parameters of the constructed normal distribution (e.g., the mean and the variance thereof) and the particular passing time. For example, the processing engine 112 may determine the reliability of passing time for the target candidate path based on a u-value associated the particular passing time. The u-value associated the particular passing time may be determined according to Equation (5) below:

$$u = (T - \mu)/\sigma' \qquad (5),$$

where u refers the u-value associated the particular passing time, T refers the particular passing time, μ refers to a mean of the normal distribution (e.g., the second estimated travel time cost), σ' refers to a standard deviation of the normal distribution (e.g., $\sigma'^2$=the second variance). In some embodiments; the processing engine 112 may look up an area of the u-value in a standard normal cumulative probability table (e.g., a table giving the area under the standard normal curve that lies to the left of a specified u-value) and determine the reliability of passing time for the target candidate path based the area of the u-value (e.g., by designating the area of the u-value as the reliability of passing time for the target candidate path).

In some embodiments, the processing engine 112 may determine the reliabilities of passing time for the target candidate path at different particular passing times (e.g., the expected travel time cost set by the user, a particular passing time that is associated with the second estimated travel time cost, a particular passing time determined based on the second estimated travel time cost and a particular rule) based on the constructed normal distribution. The processing engine 112 may direct the user terminal to display one or more target candidate path together with the corresponding reliabilities of passing time and corresponding second estimated passing time cost (or the particular passing time) respectively.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more other optional operations (e.g., a storing operation) may be added elsewhere in the exemplary process 1000.

Figure 11:
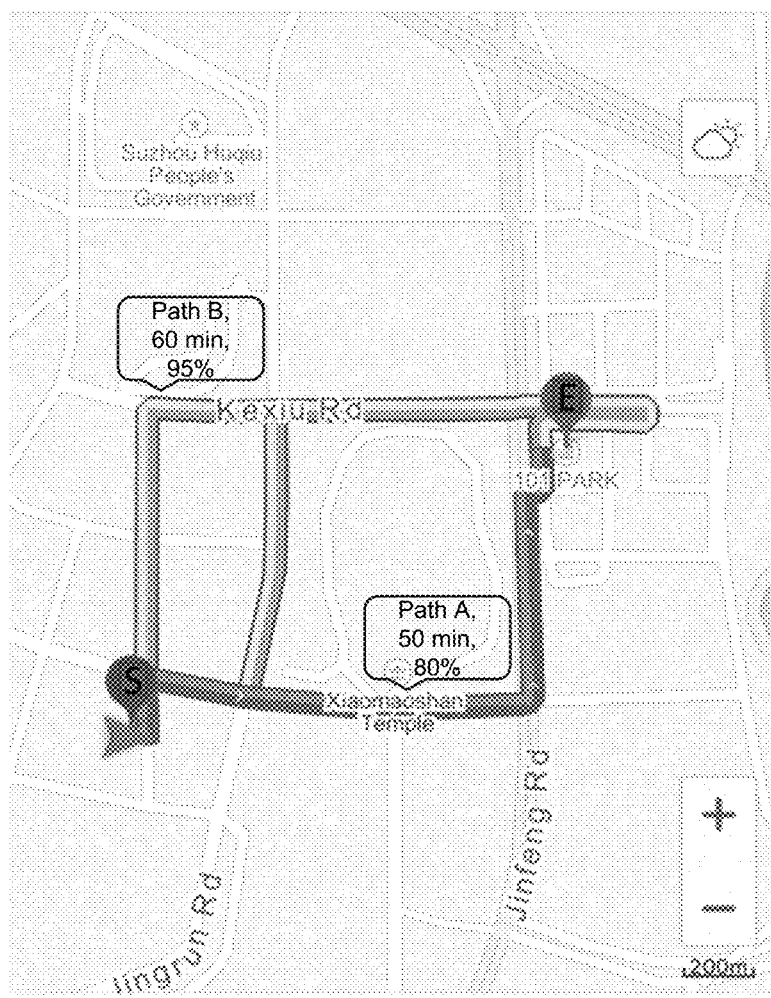
FIG. 11 is a schematic diagram illustrating an exemplary map according to some embodiments of the present disclosure.

FIG. 11 is a schematic diagram illustrating an exemplary map according to some embodiments of the present disclosure. As shown in FIG. 11, the map illustrates two target candidate paths (denoted as Path A and Path B) from a start location (S) and the end location (E). Path A is shown with a passing time of 50 minutes and a corresponding reliability of passing time of 80%, which indicates that there is a probability of 80% to pass through path A within the passing time of 50 minutes. Path B is shown with a passing time of 60 minutes and a corresponding reliability of passing time of 95%, which indicates that there is a probability of 95% to pass through path B within the passing time of 60 minutes. The passing time of Path B may be more reliable than that of Path A. For a user with a strict requirement of arrival time, the user may be more likely to select Path B for traveling.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 1703, Perl, COBOL 1702, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a software as a service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/ or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the descriptions, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A system for providing a reliability of passing time for a path in route planning, comprising:
    at least one storage medium including a set of instructions for providing a reliability for a path in route planning; and
    at least one processor in communication with the storage medium, wherein when executing the set of instructions, the at least one processor is directed to:
        obtain a route planning request including a start time from a user terminal;
        determine a plurality of candidate paths for the route planning request, each candidate path including a plurality of links;
        for each link of the plurality of links of a target candidate path,
            determine a first estimated travel time cost of the link at a target time associated with the start time; and
            determine a first variance associated with the link;
        determine a second estimated travel time cost of the target candidate path at the start time based on the first estimated travel time cost of each link of the target candidate path;
        determine a second variance associated with the target candidate path based on the first variance associated with each link of the target candidate path;
        determine a reliability of passing time for the target candidate path based on the second estimated travel time cost and the second variance, the reliability of passing time reflecting a probability that a vehicle associated with the user terminal passes through the target candidate path within a particular passing time; and
        send signals to the user terminal to direct the user terminal to display the target candidate path together with the corresponding particular passing time and the corresponding reliability on a user interface of the user terminal.

2. The system of claim 1, wherein to determine the first estimated travel time cost, the at least one processor is further directed to:
    obtain a historical travel time cost of the link at a historical target time corresponding to the target time on each historical day;
    obtain a current travel time cost of the link at a current time;
    determine a time interval between the target time and the current time; and
    determine the first estimated travel time cost based on the historical travel time cost, the current travel time cost, and the time interval.

3. The system of claim 1, wherein to determine the first variance associated with the link, the at least one processor is further directed to:
    determine a third variance associated with a historical average travel time cost;
    determine a time interval between the target time and the current time; and
    determine the first variance associated with the link based on the third variance and the time interval.

4. The system of claim 3, wherein to determine the third variance, the at least one processor is further directed to:
    obtain the historical average travel time cost of the link at a historical target time corresponding to the target time;
    obtain a historical travel time cost of the link at the historical target time on each historical day; and
    determine the third variance based on the historical average travel time cost and the historical travel time cost of the link at the historical target time on each historical day.

5. The system of claim 4, wherein to obtain the historical average travel time cost, the at least one processor is further directed to:
    determine the start time is on a weekday or a weekend; and
    in response to a determination that the start time is on a weekday, determine an average value of the historical travel time costs of the link at the historical target time corresponding to the target time of a first predetermined number of historical weekdays as the historical average travel time cost.

6. The system of claim 4, wherein to obtain the historical average travel time cost, the at least one processor is further directed to:
  determine the start time is on a weekday or a weekend; and
  in response to a determination that the start time is on a weekend, determine an average value of the historical travel time costs of the link at the historical target time corresponding to the target time of a second predetermined number of historical weekends as the historical average travel time cost.

7. The system of claim 1, wherein to determine the second estimated travel time cost, the at least one processor is further directed to:
  determine a sum of the first estimated travel time cost of each of the plurality of links of the target candidate path as the second estimated travel time cost.

8. The system of claim 1, wherein to determine the second variance, the at least one processor is further directed to:
  determine a sum of the first variance of each of the plurality of links of the target candidate path as the second variance.

9. The system of claim 1, wherein the first estimated travel time cost of each link is a normal distribution.

10. The system of claim 1, wherein to determine the reliability of passing time for the target candidate path, the at least one processor is further directed to:
  construct a normal distribution based on the second estimated travel time cost and the second variance, wherein the second estimated travel time cost is a mean of the normal distribution and the second variance is a variance of the normal distribution; and
  determine the reliability of passing time for the target candidate path based on the constructed normal distribution.

11. A method for providing a reliability of passing time for a path in route planning, comprising:
  obtaining a route planning request including a start time from a user terminal;
  determining a plurality of candidate paths for the route planning request, each candidate path including a plurality of links;
  for each link of the plurality of links of a target candidate path,
    determining a first estimated travel time cost of the link at a target time associated with the start time; and
    determining a first variance associated with the link;
  determining a second estimated travel time cost of the target candidate path at the start time based on the first estimated travel time cost of each link of the target candidate path;
  determining a second variance associated with the target candidate path based on the first variance associated with each link of the target candidate path;
  determining a reliability of passing time for the target candidate path based on the second estimated travel time cost and the second variance, the reliability of passing time reflecting a probability that a vehicle associated with the user terminal passes through the target candidate path within a particular passing time; and
  sending signals to the user terminal to direct the user terminal to display the target candidate path together with the corresponding particular passing time and the corresponding reliability on a user interface of the user terminal.

12. The method of claim 11, wherein the determining the first estimated travel time cost comprises:
  obtaining a historical travel time cost of the link at a historical target time corresponding to the target time on each historical day;
  obtaining a current travel time cost of the link at a current time;
  determining a time interval between the target time and the current time; and
  determining the first estimated travel time cost based on the historical travel time cost, the current travel time cost, and the time interval.

13. The method of claim 11, wherein the determining the first variance associated with the link comprises:
  determining a third variance associated with a historical average travel time cost;
  determining a time interval between the target time and the current time; and
  determining the first variance associated with the link based on the third variance and the time interval.

14. The method of claim 13, wherein the determining the third variance comprises:
  obtaining a historical average travel time cost of the link at a historical target time corresponding to the target time;
  obtaining a historical travel time cost of the link at the historical target time on each historical day; and
  determining the third variance based on the historical average travel time cost and the historical travel time cost of the link at the historical target time on each historical day.

15. The method of claim 14, wherein the obtaining the historical average travel time cost comprises:
  determining the start time is on a weekday or a weekend; and
  in response to a determination that the start time is on a weekday, determining an average value of the historical travel time costs of the link at the historical target time corresponding to the target time of a first predetermined number of historical weekdays as the historical average travel time cost.

16. The method of claim 14, wherein the obtaining the historical average travel time cost comprises:
  determining the start time is on a weekday or a weekend; and
  in response to a determination that the start time is on a weekend, determining an average value of the historical travel time costs of the link at the historical target time corresponding to the target time of a second predetermined number of historical weekends as the historical average travel time cost.

17. The method of claim 11, wherein the determining the second estimated travel time cost comprises:
  determining a sum of the first estimated travel time cost of each of the plurality of links of the target candidate path as the second estimated travel time cost.

18. The method of claim 11, wherein the determining the second variance comprises:
  determining a sum of the first variance of each of the plurality of links of the target candidate path as the second variance.

19. The method of claim 11, wherein the first estimated travel time cost of each link is a normal distribution.

20. A non-transitory readable medium, comprising at least one set of instructions for providing a reliability of passing time for a path in route planning, wherein when executed by at least one processor of an electrical device, the at least one set of instructions directs the at least one processor to perform a method, the method comprising:
- obtaining a route planning request including a start time from a user terminal;
- determining a plurality of candidate paths for the route planning request, each candidate path including a plurality of links;
- for each link of the plurality of links of a target candidate path,
  - determining a first estimated travel time cost of the link at a target time associated with the start time; and
  - determining a first variance associated with the link;
- determining a second estimated travel time cost of the target candidate path at the start time based on the first estimated travel time cost of each link of the target candidate path;
- determining a second variance associated with the target candidate path based on the first variance associated with each link of the target candidate path;
- determining a reliability of passing time for the target candidate path based on the second estimated travel time cost and the second variance, the reliability of passing time reflecting a probability that a vehicle associated with the user terminal passes through the target candidate path within a particular passing time; and
- sending signals to the user terminal to direct the user terminal to display the target candidate path together with the corresponding particular passing time and the corresponding reliability on a user interface of the user terminal.

\* \* \* \* \*